(12) United States Patent
Ekseth et al.

(10) Patent No.: US 8,065,085 B2
(45) Date of Patent: *Nov. 22, 2011

(54) SYSTEM AND METHOD FOR MEASURING DEPTH AND VELOCITY OF INSTRUMENTATION WITHIN A WELLBORE USING A BENDABLE TOOL

(75) Inventors: Roger Ekseth, Sjetnemarka (NO); Stephen Victor Mullin, Kingwood, TX (US); John Lionel Weston, Chedzoy (GB)

(73) Assignee: GYRODATA, Incorporated, Houston, TX (US)

( * ) Notice: Subject to any disclaimer, the term of this patent is extended or adjusted under 35 U.S.C. 154(b) by 29 days.

This patent is subject to a terminal disclaimer.

(21) Appl. No.: 11/866,213

(22) Filed: Oct. 2, 2007

(65) Prior Publication Data
US 2009/0084546 A1    Apr. 2, 2009

(51) Int. Cl.
*G01V 1/40* (2006.01)
(52) U.S. Cl. ............ 702/6; 702/9; 702/127; 702/150; 702/166; 702/10
(58) Field of Classification Search ............... 702/6, 9, 702/10, 12
See application file for complete search history.

(56) References Cited

U.S. PATENT DOCUMENTS

| | | | |
|---|---|---|---|
| 1,599,538 A * | 9/1926 | Mintrop | 181/108 |
| 3,143,892 A | 8/1964 | Chapman | |
| 3,490,149 A | 1/1970 | Bowers | |
| 3,741,500 A | 6/1973 | Liden | |
| 4,199,869 A | 4/1980 | Van Steenwyk | |
| 4,293,046 A | 10/1981 | Van Steenwyk | |
| 4,297,790 A | 11/1981 | Van Steenwyk et al. | |
| 4,433,491 A | 2/1984 | Ott et al. | |
| 4,461,088 A | 7/1984 | Van Steenwyk | |
| 4,471,533 A | 9/1984 | Van Steenwyk | |

(Continued)

FOREIGN PATENT DOCUMENTS
EP    0 497 420    8/1992
(Continued)

OTHER PUBLICATIONS

International Search Report for for Application No. PCT/US2004/021899, mailed Dec. 11, 2004 in 2 pages.

(Continued)

*Primary Examiner* — Drew A Dunn
*Assistant Examiner* — Mischita Henson
(74) *Attorney, Agent, or Firm* — Knobbe Martens Olson & Bear LLP

(57) ABSTRACT

An apparatus and method for measuring depth, velocity, or both depth and velocity of instrumentation within a wellbore is provided. The apparatus includes a downhole portion movable within the wellbore in a direction generally parallel to the wellbore. The apparatus further includes a first acceleration sensor mounted at a first position within the downhole portion. The first acceleration sensor generates a first signal indicative of a first acceleration in a first direction generally parallel to the wellbore at the first position. The apparatus further includes a second acceleration sensor mounted at a second position within the downhole portion. The second acceleration sensor generates a second signal indicative of a second acceleration in a second direction generally parallel to the wellbore at the second position. The apparatus further includes a bend sensor generating a third signal indicative of an amount of bend of at least a portion of the downhole portion.

40 Claims, 10 Drawing Sheets

U.S. PATENT DOCUMENTS

| | | | |
|---|---|---|---|
| 4,522,062 A | 6/1985 | Peters | |
| 4,535,625 A * | 8/1985 | Lyle, Jr. | 73/152.16 |
| 4,537,067 A | 8/1985 | Sharp et al. | |
| 4,545,242 A | 10/1985 | Chan | |
| 4,593,559 A | 6/1986 | Brown et al. | |
| 4,611,405 A | 9/1986 | Van Steenwyk | |
| 4,821,572 A | 4/1989 | Hulsing | |
| 4,909,336 A | 3/1990 | Brown et al. | |
| 4,987,684 A | 1/1991 | Andreas et al. | |
| 5,099,927 A | 3/1992 | Gibson et al. | |
| 5,319,561 A | 6/1994 | Matsuzaki | |
| 5,432,699 A | 7/1995 | Hache et al. | |
| 5,512,830 A | 4/1996 | Kuckes | |
| 5,522,260 A | 6/1996 | Chappellat et al. | |
| 5,585,726 A | 12/1996 | Chau | |
| 5,606,124 A | 2/1997 | Doyle et al. | |
| 5,635,638 A | 6/1997 | Geen et al. | |
| 5,635,640 A | 6/1997 | Geen et al. | |
| 5,657,547 A | 8/1997 | Uttecht et al. | |
| 5,806,195 A | 9/1998 | Uttecht et al. | |
| 5,812,068 A | 9/1998 | Wisler et al. | |
| 5,821,414 A | 10/1998 | Noy et al. | |
| 5,842,149 A | 11/1998 | Harrell et al. | |
| 5,869,760 A | 2/1999 | Geen | |
| 5,912,524 A | 6/1999 | Ohnishi et al. | |
| 5,946,094 A * | 8/1999 | Sahlgren et al. | 356/477 |
| 6,021,377 A | 2/2000 | Dubinsky et al. | |
| 6,023,325 A | 2/2000 | Sahlgren et al. | |
| 6,044,706 A | 4/2000 | Roh | |
| 6,089,089 A | 7/2000 | Hsu | |
| 6,122,961 A | 9/2000 | Geen et al. | |
| 6,134,961 A | 10/2000 | Touge et al. | |
| 6,145,378 A | 11/2000 | MacRobbie et al. | |
| 6,173,773 B1 | 1/2001 | Almaguer et al. | |
| 6,173,793 B1 | 1/2001 | Thompson et al. | |
| 6,192,748 B1 | 2/2001 | Miller | |
| 6,206,108 B1 | 3/2001 | MacDonald et al. | |
| 6,257,356 B1 | 7/2001 | Wassell | |
| 6,267,185 B1 | 7/2001 | Mougel et al. | |
| 6,272,434 B1 | 8/2001 | Wisler et al. | |
| 6,281,618 B1 | 8/2001 | Ishitoko et al. | |
| 6,315,062 B1 | 11/2001 | Alft et al. | |
| 6,347,282 B2 | 2/2002 | Estes et al. | |
| 6,360,601 B1 | 3/2002 | Challoner et al. | |
| 6,381,858 B1 | 5/2002 | Shirasaka | |
| 6,389,187 B1 * | 5/2002 | Greenaway et al. | 385/13 |
| 6,431,270 B1 | 8/2002 | Angle | |
| 6,453,239 B1 | 9/2002 | Shirasaka et al. | |
| 6,484,818 B2 | 11/2002 | Alft et al. | |
| 6,529,834 B1 | 3/2003 | Estes et al. | |
| 6,655,460 B2 | 12/2003 | Bailey et al. | |
| 6,659,201 B2 | 12/2003 | Head et al. | |
| 6,714,870 B1 | 3/2004 | Weston et al. | |
| 6,837,332 B1 | 1/2005 | Rodney | |
| 6,845,665 B2 | 1/2005 | Green | |
| 6,848,304 B2 | 2/2005 | Green | |
| 6,859,751 B2 | 2/2005 | Cardarelli | |
| 6,895,678 B2 | 5/2005 | Ash et al. | |
| 6,957,580 B2 * | 10/2005 | Ekseth et al. | 73/488 |
| 7,028,409 B2 | 4/2006 | Engebretson et al. | |
| 7,117,605 B2 | 10/2006 | Ekseth et al. | |
| 7,225,550 B2 | 6/2007 | Ekseth et al. | |
| 7,350,410 B2 | 4/2008 | Ekseth et al. | |
| 7,584,788 B2 * | 9/2009 | Baron et al. | 166/255.2 |
| 2002/0032529 A1 | 3/2002 | Duhon | |
| 2002/0046605 A1 | 4/2002 | Geen et al. | |
| 2002/0056201 A1 | 5/2002 | Dallas et al. | |
| 2002/0112887 A1 | 8/2002 | Harrison | |
| 2005/0022404 A1 | 2/2005 | Ash et al. | |
| 2005/0109097 A1 * | 5/2005 | Bogath et al. | 73/152.49 |
| 2005/0150689 A1 | 7/2005 | Jogi et al. | |
| 2005/0183502 A1 | 8/2005 | Rodney | |
| 2005/0224257 A1 | 10/2005 | Ekseth et al. | |
| 2005/0284221 A1 * | 12/2005 | Danisch et al. | 73/488 |
| 2006/0070770 A1 * | 4/2006 | Marsh | 175/27 |
| 2006/0253253 A1 | 11/2006 | Reynolds et al. | |
| 2007/0235226 A1 | 10/2007 | Wright et al. | |
| 2009/0119937 A1 | 5/2009 | Watson | |
| 2010/0100329 A1 * | 4/2010 | Ekseth et al. | 702/7 |

FOREIGN PATENT DOCUMENTS

| | | |
|---|---|---|
| EP | 0 646 696 A1 | 9/1994 |
| EP | 2 045 440 | 4/2009 |
| GB | 2172324 | 9/1986 |
| GB | 2177738 | 1/1987 |
| WO | WO 02/103158 | 12/2002 |
| WO | WO 2005/008029 | 1/2005 |
| WO | WO 2005/073509 | 8/2005 |
| WO | WO 2005/100916 | 10/2005 |

OTHER PUBLICATIONS

"Reflex Maxibor II, Borehole Survey System". Reflex Product Information, Printed from www.reflex.se on Feb. 7, 2007 in 8 pages.

International Search Report and Written Opinion for PCT/US2010/021538, mailed Aug. 12, 2010 in 15 pages.

International Search Report and Written Opinion for PCT/US2010/022653, mailed mailed Dec. 8, 2010 in 13 pages.

±*150°/s Single Chip Yaw Rate Gyro with Signal Conditioning*, Analog Devices, ADXRS150, © 2003 Analog Devices, Inc.

±*300°/s Single Chip Yaw Rate Gyro with Signal Conditioning*, Analog Devices, ADXRS300, © 2004.

Geen, J., et al., *New iMEMS® Angular-Rate-Sensing Gyroscope*, Analog Dialogue, 2003, vol. 37, No. 3, pp. 1-4.

Teegarden, Darrell, et al., *How to Model and Simulate Microgyroscope Systems*, IEEE Spectrum, Jul. 1998, vol. 35, No. 7, pp. 66-75.

Uttecht, G.W., et al., "Survey Accuracy is Improved by a New, Small OD Gyro," *World Oil*, Mar. 1983.

Yazdi, N., et al., *Micromachined Inertial Sensors*, Proc. of the IEEE, Aug. 1998, vol. 86, No. 8, pp. 1640-1659.

US 6,151,553, 11/2000, Estes et al. (withdrawn)

* cited by examiner

SYSTEM AND METHOD FOR MEASURING DEPTH AND VELOCITY OF INSTRUMENTATION WITHIN A WELLBORE USING A BENDABLE TOOL

BACKGROUND OF THE INVENTION

1. Field of the Invention

The present application relates generally to systems and methods for determining the depth, the velocity, or both the depth and the velocity of an instrumentation package within a wellbore.

2. Description of the Related Art

Surface-based wellbore depth measurements are typically made periodically during wellbore drilling for the exploration of oil and gas deposits to determine the absolute depth of the drilling tool within the wellbore. In such measurements, the depth of the drilling tool is typically determined by surface measurements of the lengths of the pipe sections inserted into the wellbore between the drilling tool and the surface.

Using wireline surveys, the drilling of the wellbore is periodically halted and a survey tool is lowered into the wellbore. As the survey tool is guided along the wellbore, it can provide information regarding its orientation and location by sending signals through a wire or cable to the surface. The absolute depth of the survey tool down the wellbore is typically given by a surface-based measurement of the length of the wire or cable between the survey tool and the surface. Similarly, surface-based logging measurements of the absolute depth of detected geological formations are typically made by surface measurements of the length of the wire or cable between the logging tool and the surface. However, due to various distortions, the cumulative length of the pipe sections or of the wire while within the wellbore can differ from the cumulative length measured at the surface, resulting in errors in the determination of the absolute depth.

In addition, surface-based measurements of the velocity of the survey tool along the wellbore can be used to determine the relative distances between detected features or formations within the wellbore. For example, the time period between detecting two separate features along the wellbore and the velocity of the survey tool during this time period can be multiplied together to provide the relative distance between the two detected features. However, as with the surface-based depth measurements described above, surface-based velocity measurements do not provide a sufficient accuracy (e.g., within only a few centimeters) to tell when two geophysical sensors with significant along-hole separation pass the same geological formation within only a few centimeters of accuracy. For example, due to friction or other effects within the wellbore, the survey tool can move in a jerking manner with varying velocity. In addition, these effects can result in the velocity of the survey tool within the wellbore differing from the measured velocity of the wire or cable at the surface.

Inertial navigation systems have been proposed as being able to provide improved wellbore depth and velocity measurements. Such inertial navigation systems can determine the depth of the survey tool by double integration of the detected acceleration. However, such procedures are vulnerable to errors in the detected acceleration, which results in a drift of the depth measurement from the true depth of the survey tool. It has been difficult, and will likely continue to be difficult, to get such inertial navigation systems to work without providing aiding data such as surface-based depth measurements or updates of the depth obtained while the survey tool is stationary (i.e., zero-velocity updates) to remove this drift. However, it is generally desirable to avoid using surface-based aiding data, since such data would effectively transform an inertial navigation system into a surface-depth system, thereby including the problems of such systems. It is also generally desirable to avoid zero-velocity updates due to large increases in the time and costs of conducting such surveys.

Improved wellbore depth and velocity measurements are desirable to understand the geological formations being drilled and the oil or gas deposits being accessed. For example, improved measurements can resolve uncertainties in the depth measurements of a geological fault from wellbore positioning surveys in two nearby wells. In addition, improved wellbore depth measurements are helpful for drilling safety by providing more reliable information regarding the true wellbore depth to avoid drilling into adjacent wells.

SUMMARY OF THE INVENTION

In certain embodiments, an apparatus for use in a wellbore is provided. The apparatus comprises a downhole portion movable within the wellbore in a direction generally parallel to the wellbore. The apparatus further comprises a first acceleration sensor mounted at a first position within the downhole portion. The first acceleration sensor generates a first signal indicative of a first acceleration in a first direction generally parallel to the wellbore at the first position. The apparatus further comprises a second acceleration sensor mounted at a second position within the downhole portion. The second acceleration sensor generates a second signal indicative of a second acceleration in a second direction generally parallel to the wellbore at the second position. The apparatus further comprises a bend sensor generating a third signal indicative of an amount of bend of at least a portion of the downhole portion.

In certain embodiments, a method generates information indicative of a depth or a velocity, or both a depth and a velocity, of a downhole portion of a tool movable within a wellbore. The method comprises providing a tool comprising a downhole portion, a first acceleration sensor, a second acceleration sensor, and a bend sensor. The downhole portion is movable within the wellbore in a direction generally parallel to the wellbore. The first acceleration sensor is mounted at a first position within the downhole portion. The first acceleration sensor generates a first signal indicative of a first acceleration in a first direction generally parallel to the wellbore at the first position. The second acceleration sensor is mounted at a second position within the downhole portion. The second acceleration sensor generates a second signal indicative of a second acceleration in a second direction generally parallel to the wellbore at the second position. The bend sensor generates a third signal indicative of an amount of bend of at least a portion of the downhole portion. The method further comprises generating the first signal, the second signal, and the third signal while the downhole portion is at a first location within the wellbore. The method further comprises generating the first signal, the second signal, and the third signal while the downhole portion is at a second location within the wellbore.

In certain embodiments, a method determines a depth or a velocity, or both a depth and a velocity, of a downhole portion of a tool movable within a wellbore. The method comprises receiving one or more acceleration measurements from at least one acceleration sensor in the downhole portion of the tool. The method further comprises receiving one or more measurements of an amount of bend of at least a portion of the downhole portion. The method further comprises calculating a depth, or a velocity, or both a depth and a velocity, of the downhole portion of the tool in response to the one or more acceleration measurements and the one or more measurements of the amount of bend.

In certain embodiments, a bendable tool for use in a wellbore is provided. The tool comprises a first acceleration sensor mounted within the tool. The first acceleration sensor is configured to generate a first signal indicative of a first acceleration of the first acceleration sensor in a first direction generally parallel to the wellbore. The tool further comprises a second acceleration sensor mounted within the tool. The second acceleration sensor is configured to generate a second signal indicative of a second acceleration of the second acceleration sensor in a second direction generally parallel to the wellbore. The tool further comprises a bend sensor configured to generate a third signal indicative of an amount of bend of at least a portion of the tool between the first acceleration sensor and the second acceleration sensor.

In certain embodiments, a system for use with an apparatus configured to be inserted into a wellbore is provided. The system comprises one or more inputs configured to receive a first signal from a first acceleration sensor of the apparatus, a second signal from a second acceleration sensor of the apparatus, and a third signal from a bend sensor of the apparatus. The first acceleration sensor is within a downhole portion of the apparatus, and the second acceleration sensor is within the downhole portion of the apparatus and spaced from the first acceleration sensor generally along the wellbore. The first signal is indicative of a first acceleration of the first acceleration sensor in a first direction generally parallel to the wellbore. The second signal is indicative of a second acceleration of the second acceleration sensor in a second direction generally parallel to the wellbore. The third signal is indicative of an amount of bend of at least a portion of the apparatus between the first acceleration sensor and the second acceleration sensor. The tool further comprises a controller configured to calculate a depth, a velocity, or both a depth and a velocity of the downhole portion within the wellbore in response to the first signal, the second signal, and the third signal.

DETAILED DESCRIPTION

Certain embodiments described herein provide a true downhole-based system for measuring a depth, a velocity, or both a depth and a velocity of a downhole portion with sufficient accuracy for logging and drilling applications.

Figure 1:
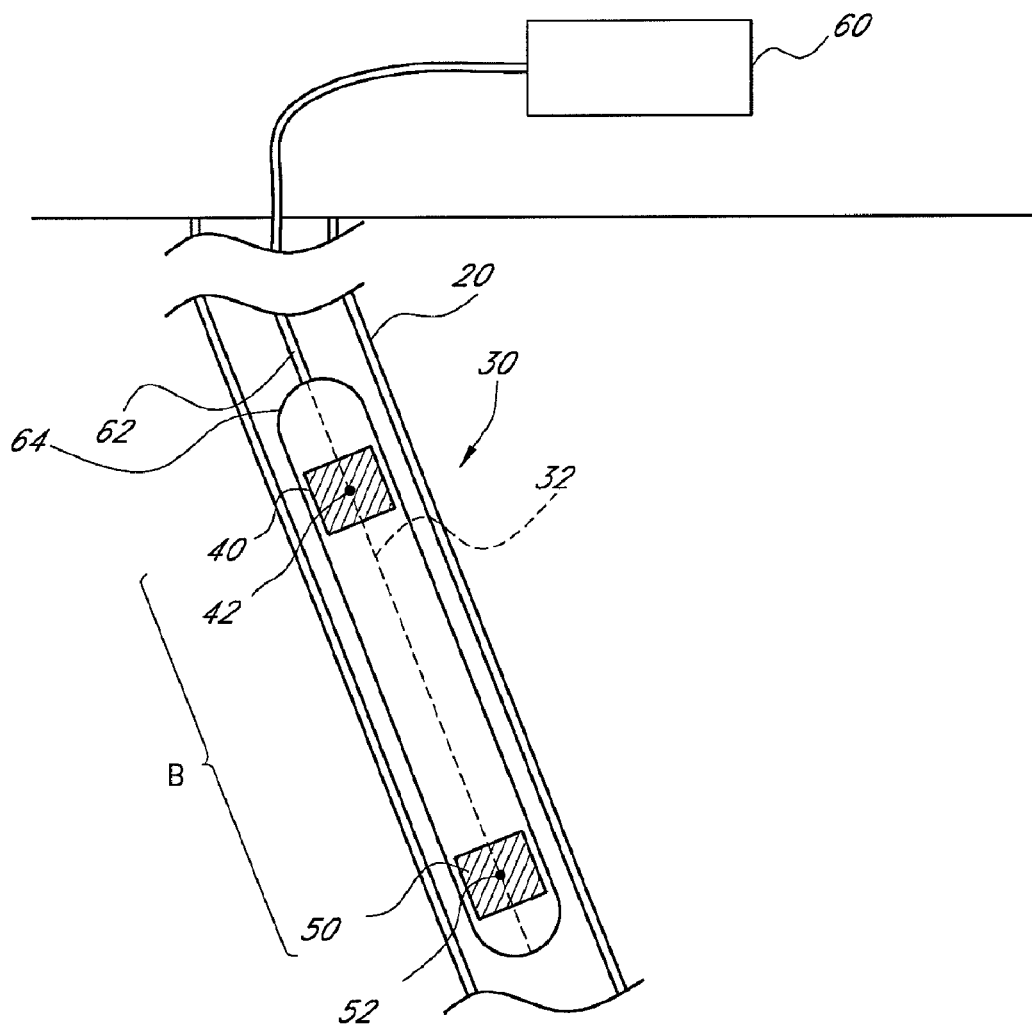
FIG. 1 schematically illustrates an example survey tool compatible with certain embodiments described herein for use in a wellbore.

FIG. 1 schematically illustrates an example survey tool 10 compatible with certain embodiments described herein for use in a wellbore 20. The survey tool 10 comprises a downhole portion 30 having an axis 32. The downhole portion 30 is adapted to move within the wellbore 20 with the axis 32 generally parallel to the wellbore 20. The survey tool 10 further comprises a first acceleration sensor 40 mounted at a first position 42 within the downhole portion 30. The first acceleration sensor 40 is adapted to generate a first signal indicative of an acceleration of the first acceleration sensor 40 along the axis 32. The survey tool 10 further comprises a second acceleration sensor 50 mounted at a second position 52 within the downhole portion 30. The second position 52 is spaced from the first position 42 by a non-zero distance B along the axis 32. The second acceleration sensor 50 is adapted to generate a second signal indicative of an acceleration of the second acceleration sensor 50 along the axis 32. The survey tool 10 further comprises a controller 60 adapted to receive the first signal and the second signal. The controller 60 is further adapted to calculate a depth, a velocity, or both a depth and a velocity of the downhole portion 30 in response to the first signal and the second signal. In the embodiment schematically illustrated by FIG. 1, the controller 60 is at the surface and is coupled to the downhole portion 30 by a cable 62.

In certain embodiments, the survey tool 10 is a component of a drill string and is used to determine the actual depth of a drilling tool (e.g., drill bit) of the drilling assembly. Drill strings compatible with embodiments described herein include, but are not limited to, measurement-while-drilling (MWD) strings. In certain other embodiments, the survey tool 10 is a component of a navigational string and is used to determine at least a portion of the wellbore path. In certain other embodiments, the survey tool 10 is a component of a logging string and is used to determine the actual depth of detected geological features along the wellbore 20 or relative depths between detected geological features along the wellbore 20. Logging strings compatible with embodiments described herein include, but are not limited to, logging-while-drilling (LWD) strings. In certain embodiments, the drill string or the logging string includes a sufficient number of sensors and adequate spacings between the first acceleration sensor 40 and the second acceleration sensor 50 to perform the method described below. In certain embodiments, the drill string or the logging string includes additional acceleration sensors (e.g., cross-axial accelerometers) that can be used to provide measurements for the determination of the inclination and high-side toolface angle of the downhole instrumentation at intervals along the well path trajectory.

In certain embodiments, the downhole portion 30 comprises a housing 64 containing at least one of the acceleration sensors. As schematically illustrated by FIG. 1, the housing 64 of certain embodiments contains both the first acceleration sensor 40 and the second acceleration sensor 50. In other embodiments, the first acceleration sensor 40 and the second acceleration sensor 50 are not contained in a single housing, but are positioned on different portions of the downhole portion 30. In certain embodiments, the downhole portion 30 further comprises portions (not shown), such as collars or extensions, which contact an inner surface of the wellbore 20 to position the housing 64 substantially collinearly with the wellbore 20.

Figure 2:
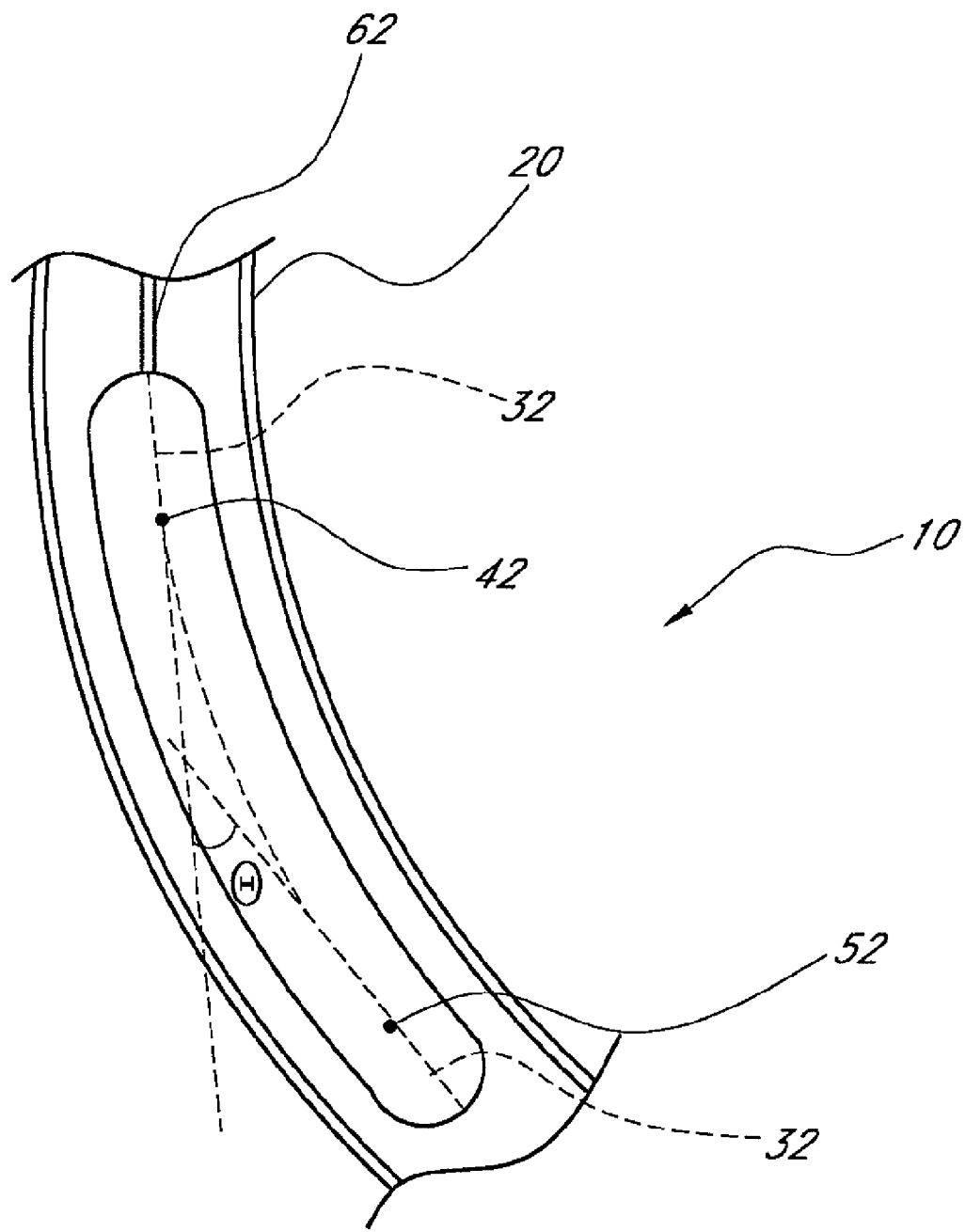
FIG. 2 schematically illustrates an example survey tool in a portion of the wellbore having a curvature.

In certain embodiments, the downhole portion 30 is adapted to bend as the downhole portion 30 moves through a curved portion of the wellbore 20. FIG. 2 schematically illustrates an example survey tool 10 having a downhole portion 30 within a section of the wellbore 20 having a curvature such that the direction of the wellbore 20 changes by a non-zero angle θ. In certain such embodiments, the downhole portion 30 bends by the non-zero angle θ such that the axis 32 of the downhole portion 30 is substantially parallel to the wellbore 20. Under such conditions, the axis 32 at the first position 42 is at the non-zero angle with respect to the axis 32 at the second position 52.

In certain embodiments, the first acceleration sensor 40 and the second acceleration sensor 50 comprise accelerometers currently used in conventional wellbore survey tools. In certain embodiments, one or both of the first acceleration sensor 40 and the second acceleration sensor 50 comprise a single-axis accelerometer sensitive to accelerations along a single sensing direction. In certain such embodiments, the single-axis accelerometer is advantageously mounted so that its sensing direction is substantially parallel with the axis 32 of the downhole portion 30. In other embodiments, one or both of the first acceleration sensor 40 and the second acceleration sensor 50 comprise a two-axis or a three-axis accelerometer sensitive to accelerations in multiple directions (e.g., a multiple-axis accelerometer). For example, a three-axis acceleration sensor can be used capable of measuring accelerations along the axis of the downhole portion 30 and in two generally orthogonal directions in a plane (e.g., a cross-axial plane) that is generally perpendicular to the axis of the downhole portion 30. In certain embodiments, the x and y axes are defined to lie in the cross-axial plane while the z axis is coincident with the axis of the wellbore 20 or the downhole portion 30. In certain such embodiments, the multiple-axis accelerometer is advantageously mounted so that it is sensitive to accelerations along at least one direction parallel to the axis 32 of the downhole portion 30. In certain embodiments, the first acceleration sensor 40 and the second acceleration sensor 50 are advantageously substantially identical. Example accelerometers include, but are not limited to, quartz flexure suspension accelerometers available from a variety of vendors. Other types of acceleration sensors are also compatible with certain embodiments described herein.

In certain embodiments, the distance B between the first position 42 and the second position 52 along the axis 32 of the downhole portion 30 is advantageously selected to be long enough to respond to curvature of the wellbore 20 such that the downhole portion 30 bends substantially equally to the curvature of the wellbore 20. The distance B of certain embodiments is selected such that the first acceleration sensor 40 and the second acceleration sensor 50 detect different accelerations along the axis 32 when the downhole portion 30 is in a curved portion of the wellbore 20. In certain embodiments, the distance B is larger than approximately 10 meters, while in other embodiments, the distance B is in a range between approximately 10 meters and approximately 30 meters. Other distances B are compatible with certain embodiments described herein.

Figure 3:
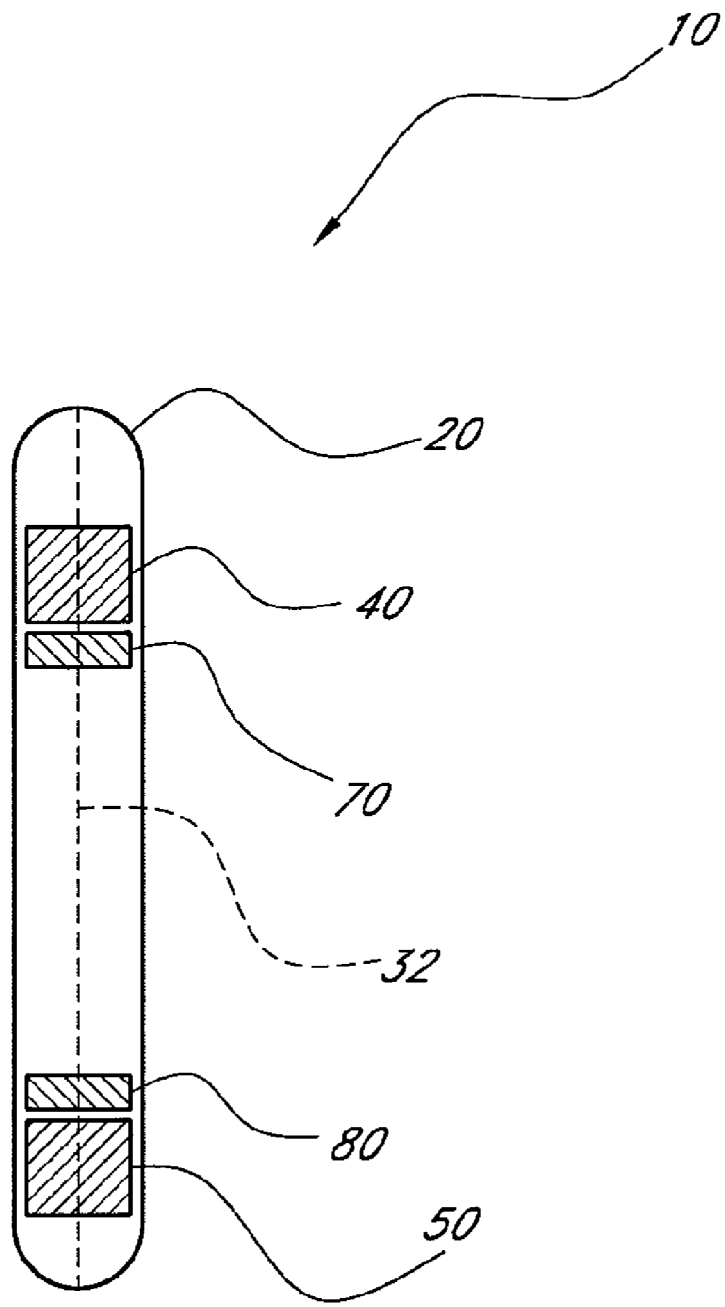
FIG. 3 schematically illustrates an example survey tool as part of a logging assembly having a first supplementary sensor and a second supplementary sensor.

In certain embodiments, the downhole portion 30 comprises one or more supplementary sensors in addition to the first acceleration sensor 40 and the second acceleration sensor 50. FIG. 3 schematically illustrates an example survey tool 10 comprising a first supplementary sensor 70 and a second supplementary sensor 80. Example supplementary sensors of the downhole portion 30 include, but are not limited to, gamma-ray sensors adapted to detect gamma rays from geological formations in proximity to the downhole portion 30 and magnetic sensors adapted to detect casing collars of the pipe casing sections of the wellbore 20 in proximity to the downhole portion 30. In the embodiment schematically illustrated by FIG. 3, the first supplementary sensor 70 is below and in proximity to the first acceleration sensor 40 and the second supplementary sensor 80 is above and in proximity to the second acceleration sensor 50. Other embodiments can have other configurations of at least one supplementary sensor and the two acceleration sensors. In certain embodiments, such supplementary sensors are used in conjunction with the survey tool 10, as described more fully below, to provide additional data which is used to aid the determination of the depth, the velocity, or both the depth and the velocity of the downhole portion 30 within the wellbore 20.

In certain embodiments, the controller 60 is adapted to determine the depth, the velocity, or both the depth and the velocity of the downhole portion 30 in response to signals received from the various sensors of the downhole portion 30. In certain embodiments, the controller 60 comprises a microprocessor adapted to perform the method described below for determining the depth, the velocity, or both the depth and the velocity of the downhole portion 30 within the wellbore 20. In certain embodiments, the controller 60 further comprises a memory subsystem adapted to store at least a portion of the data obtained from the various sensors. The controller 60 can comprise hardware, software, or a combination of both hardware and software to accomplish the calculation of the depth, the velocity, or both the depth and the velocity. In certain embodiments, the controller 60 comprises a standard personal computer.

In certain embodiments, at least a portion of the controller 60 is located within the downhole portion 30. In certain other embodiments, at least a portion of the controller 60 is located at the surface and is coupled to the downhole portion 30 within the wellbore 20 by a wire or cable 62. In certain such embodiments, the cable 62 comprises signal conduits through which signals are transmitted from the various sensors within the downhole portion 30 to the controller 60. In certain embodiments in which the controller 60 is adapted to generate control signals for the various components of the survey tool 10 in the downhole portion 30, the cable 62 is adapted to transmit the control signals from the controller 60 to the downhole portion 30. In certain embodiments in which the downhole portion 30 is part of a wellbore drilling system capable of measurement while drilling (MWD) or logging while drilling (LWD), signals from the downhole portion 30 are transmitted by mud pulse telemetry using rapid fluctuations in the pressure of a closed loop circulating system or electromagnetic (EM) telemetry.

In certain embodiments, the controller 60 is adapted to perform a post-processing analysis of the data obtained from the various sensors of the survey tool 10. In certain such post-processing embodiments, data is obtained and saved from the various sensors of the survey tool 10 as the downhole portion 30 travels within the wellbore 20, and the saved data are later analyzed to determine relative depths and/or absolute depths of the various detected features. The saved data obtained from the various sensors, including any aiding data (described more fully below) advantageously includes time reference information (e.g., time tagging) so that the relative times of the detection of various features can be determined. In certain embodiments, the relevant data from the various sensors are manually inspected and correlated with one another to provide aiding data. In other embodiments, the controller 60 performs this correlation of the saved data automatically to provide the aiding data.

In certain other embodiments, the controller 60 provides a real-time processing analysis of the signals or data obtained from the various sensors of the survey tool 10. In certain such real-time processing embodiments, data obtained from the various sensors of the survey tool 10 are analyzed while the downhole portion 30 travels within the wellbore 20. In certain embodiments, at least a portion of the data obtained from the various sensors is saved in memory for analysis by the controller 60. The controller 60 of certain such embodiments comprises sufficient data processing and data storage capacity to perform the real-time analysis. In certain embodiments, the relevant data from the various sensors are advantageously correlated with one another by the controller 60 to provide aiding data. In certain embodiments, the processing analysis can include a recursive estimation algorithm.

Figure 4A:
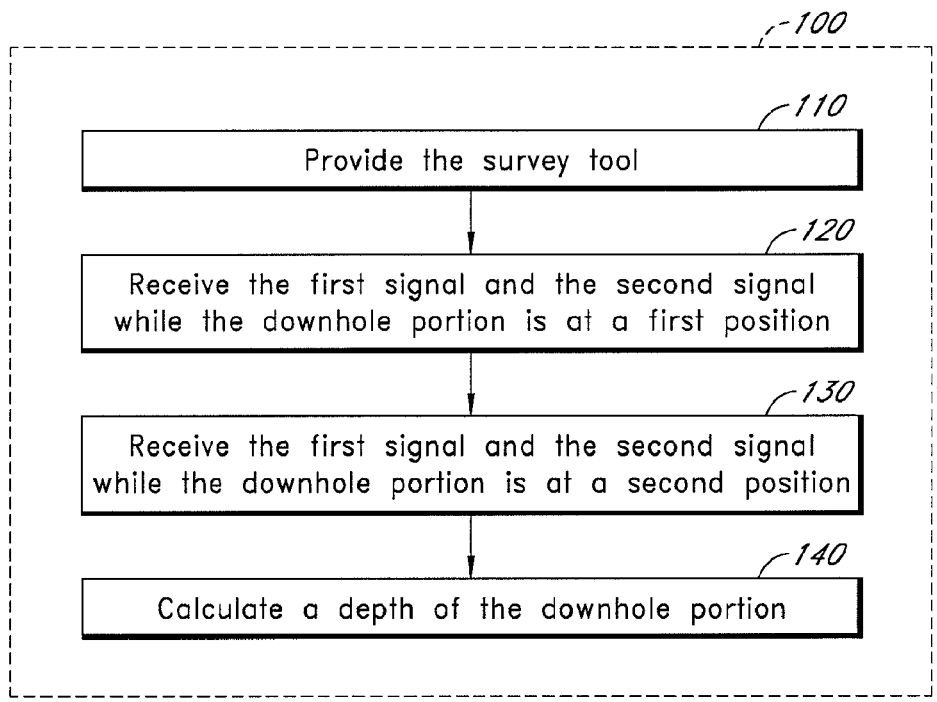
FIG. 4A is a flowchart of an example method of determining a depth of a downhole portion of a survey tool in accordance with certain embodiments described herein.

FIG. 4A is a flowchart of an example method 100 for determining a depth of a downhole portion 30 of a survey tool 10 along a wellbore 20 in accordance with certain embodiments described herein. While the method 100 is described herein by reference to the survey tool 10 schematically illustrated by FIGS. 1-3, other survey tools 10 are also compatible with embodiments of the method 100.

In certain embodiments, the method 100 comprises providing the survey tool 10 comprising a downhole portion 30 within the wellbore 20 in an operational block 110. The downhole portion 30 comprises a first acceleration sensor 40 and a second acceleration sensor 50. The first acceleration sensor 40 is adapted to generate a first signal indicative of an acceleration of the first acceleration sensor 40 along the wellbore 20. The second acceleration sensor 50 is adapted to generate a second signal indicative of an acceleration of the second acceleration sensor 50 along the wellbore 20. The second acceleration sensor 50 is spaced from the first acceleration sensor 40 by a non-zero distance.

In certain embodiments, the method 100 further comprises receiving the first signal and the second signal while the downhole portion 30 is at a first location within the wellbore 20 in an operational block 120. The downhole portion 30 of certain embodiments is stationary while at the first location, while in other embodiments, the downhole portion 30 is moving along the wellbore 20 while at the first location.

In certain embodiments, the method 100 further comprises receiving the first signal and the second signal while the downhole portion 30 is at a second location within the wellbore 20 in an operational block 130. The downhole portion 30 of certain embodiments is stationary while at the second location, while in other embodiments, the downhole portion 30 is moving along the wellbore 20 while at the second location.

In certain embodiments, the method 100 further comprises calculating a depth of the downhole portion 30 in an operational block 140. The depth is calculated in response to the first signal and the second signal received while the downhole portion 30 is at the first location and in response to the first signal and the second signal received while the downhole portion 30 is at the second location.

Figure 4B:
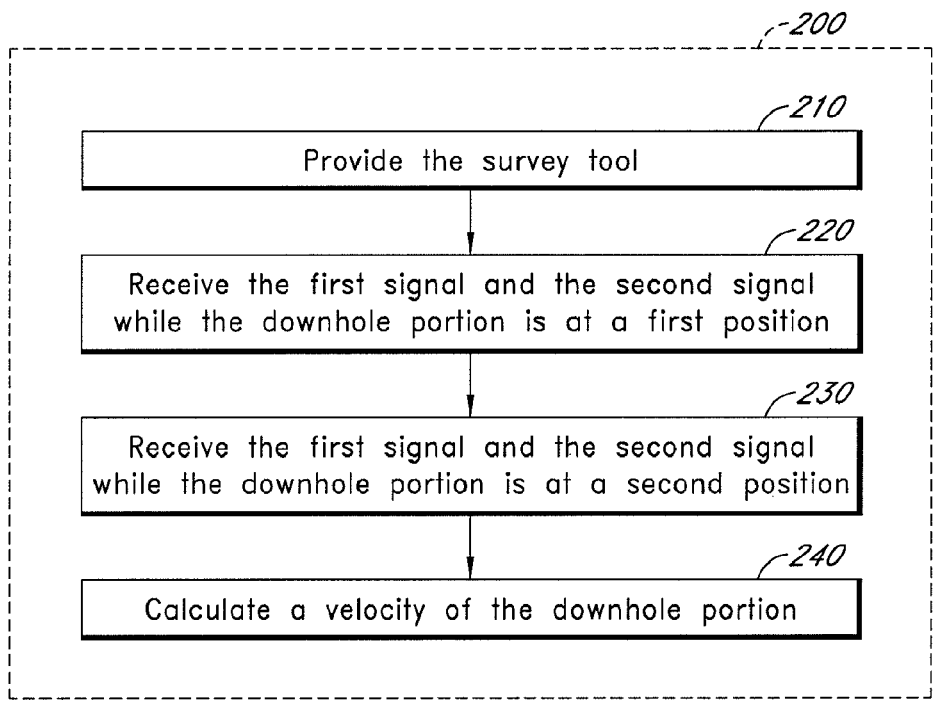
FIG. 4B is a flowchart of an example method of determining a velocity of a downhole portion of a survey tool in accordance with certain embodiments described herein.

FIG. 4B is a flowchart of an example method 200 for determining a velocity of a downhole portion 30 of a survey tool 10 between two locations along a wellbore 20 in accordance with certain embodiments described herein. While the method 200 is described herein by reference to the survey tool 10 schematically illustrated by FIGS. 1-3, other survey tools 10 are also compatible with embodiments of the method 200.

In certain embodiments, the method 200 comprises providing the survey tool 10 comprising a downhole portion 30 in an operational block 210. The downhole portion 30 comprises a first acceleration sensor 40 and a second acceleration sensor 50. The first acceleration sensor 40 is adapted to generate a first signal indicative of an acceleration of the first acceleration sensor 40 along the wellbore. The second acceleration sensor 50 is adapted to generate a second signal indicative of an acceleration of the second acceleration sensor 50 along the wellbore. The second acceleration sensor 50 is spaced from the first acceleration sensor 40 by a non-zero distance.

In certain embodiments, the method 200 further comprises receiving the first signal and the second signal while the downhole portion 30 is at a first location within the wellbore 20 in an operational block 220. The downhole portion 30 of certain embodiments is moving along the wellbore 20 while at the first location. In certain embodiments, the method 200 further comprises receiving the first signal and the second signal while the downhole portion 30 is at a second location within the wellbore 20 in an operational block 230. The downhole portion 30 of certain embodiments is moving along the wellbore 20 while at the second location.

In certain embodiments, the method 200 further comprises calculating a velocity of the downhole portion 30 between the first location and the second location in an operational block 240. The velocity is calculated in response to the first signal and the second signal received while the downhole portion 30 is at the first location and in response to the first signal and the second signal received while the downhole portion 30 is at the second location.

An example embodiment for determining the depth, the velocity, or both the depth and the velocity of a downhole portion 30 of a survey tool 10 utilizing a first acceleration sensor 40 and a second acceleration sensor 50 is described below. While the example embodiment described below has a minimum number of variables, other embodiments are not limited to only these variables. Additional variables may also be used, including, but not limited to, misalignments of the acceleration sensors relative to the axis 32. In certain embodiments, the units of the parameters and variables below are in meters-kilogram-second (MKS) units.

Aiding data from other downhole supplementary sensors (e.g., gamma-ray sensors, magnetic sensors for locating casing collars) is advantageously included in certain embodiments to enhance the resultant accuracy of the results. Other embodiments do not utilize aiding data or such supplementary sensors. The example embodiment described below includes the use of aiding data, such as velocity data, absolute-depth data, and relative-depth data. Other types and/or combinations of aiding data are also used in certain other embodiments.

In the example embodiment described below, the periodicity of the measurements from the two accelerometers define time periods or "epochs" whereby one set of accelerometer measurements are taken at every epoch k. Aiding data are taken in the example embodiments only at a subset of these epochs. In certain embodiments, the different types of aiding data are taken the same epochs, while in other embodiments, the different types of aiding data are taken at different epochs.

In the example embodiment described below, the first acceleration sensor 40 is referred to as the "upper acceleration sensor" and the second acceleration sensor 50 is referred to as the "lower acceleration sensor." The terms "upper" and "lower" are used herein merely to distinguish the two acceleration sensors according to their relative positions along the wellbore 20, and are not to be interpreted as limiting. Other embodiments distinguish the two acceleration sensors from one another using other terms.

EXAMPLE EMBODIMENT

State Vector with Five Elements

The example embodiment described below utilizes a state vector having five elements and the following parameters:
g=magnitude of gravity;
Δt=time between updates; and
B=distance between the upper acceleration sensor 40 (denoted below by the subscript "U") and the lower acceleration sensor 50 (denoted below by the subscript "L").
In certain embodiments, the time between updates Δt is synchronized with the clock frequency of the computer system used to perform the example embodiment.

The state vector $X_k$ at epoch k is expressed as follows:

$$X_k = [a_k \, v_k \, D_{L,k} \, d_k \, I_{L,k}]^T;$$ (Eq. 1)

where $a_k$ is the calculated acceleration of the survey tool 10 in a direction generally parallel to the wellbore 20, $v_k$ is the calculated velocity of the survey tool 10 in a direction generally parallel to the wellbore 20, $D_{L,k}$ is the calculated depth of the lower acceleration sensor 50, $d_k$ is the calculated apparent dogleg, which is equal to the difference between the inclinations of the lower acceleration sensor 50 and the upper acceleration sensor 40, divided by the distance B (i.e., $d_k = (I_{L,k} - I_{U,k})/B$), and $I_{L,k}$ is the calculated inclination of the lower acceleration sensor 50, assuming that azimuth changes between the upper and lower acceleration sensors are relatively small, which is true in certain embodiments described herein.

The state co-variance matrix at epoch k is expressed as follows:

$$\Sigma_k = \begin{bmatrix} \sigma_{a,k}^2 & \sigma_{av,k} & \sigma_{aD,k} & \sigma_{ad,k} & \sigma_{aI,k} \\ \sigma_{va,k} & \sigma_{v,k}^2 & \sigma_{vD,k} & \sigma_{vd,k} & \sigma_{vI,k} \\ \sigma_{Da,k} & \sigma_{Dv,k} & \sigma_{D,k}^2 & \sigma_{Dd,k} & \sigma_{DI,k} \\ \sigma_{da,k} & \sigma_{dv,k} & \sigma_{dD,k} & \sigma_{d,k}^2 & \sigma_{dI,k} \\ \sigma_{Ia,k} & \sigma_{Iv,k} & \sigma_{ID,k} & \sigma_{Id,k} & \sigma_{I,k}^2 \end{bmatrix};$$ (Eq. 2)

where $\sigma_{i,k}^2$ is the variance of parameter number i in state vector $X_k$, and $\sigma_{ij,k}$ is the co-variance between parameter number i and j in state vector $X_k$.

The initial state at epoch k=0, corresponding to the survey tool 10 in a stationary condition within the wellbore 20 is given by the following:

$$X_0 = [0 \, 0 \, D_{L,0}(I_{L,0} - I_{U,0})/B \, I_{L,0}]^T;$$ (Eq. 3)

where $D_{L,0}$ is the initial depth of the lower acceleration sensor 50, $I_{L,0}$ is the initial inclination of the lower acceleration sensor 50, and $I_{U,0}$ is the initial inclination of the upper acceleration sensor 40.

In certain embodiments, the initial depth is referred to a known point in the wellbore 20. The initial inclinations of certain embodiments is determined from stationary acceleration sensor measurements or from known wellbore geometry of a landmark location. Additional acceleration sensors are compatible with the use of acceleration-sensor-based initial inclinations. In certain embodiments, a pair of high-side cross-axial acceleration sensors can be used to provide initial stationary acceleration measurements in a direction substantially perpendicular to the axis 32 and having a component in a vertical plane. In other embodiments, the first acceleration sensor 40 and the second acceleration sensor 50 each comprises a multiple-axis accelerometer (e.g., a two-axis or a three-axis accelerometer) that provides signals indicative of the acceleration parallel to the axis 32 and the acceleration in a direction substantially perpendicular to the axis 32 and having a component in a vertical plane. In certain such embodiments, the initial inclinations are then given by:

$$I_{L,0} = \arctan(-HA_{L,0}/A_{L,0});$$ (Eq. 4)

$$I_{U,0} = \arctan(-HA_{U,0}/A_{U,0});$$ (Eq. 5)

where $A_{L,0}$ is the initial lower acceleration sensor measurement in a direction generally parallel to the axis 32, $A_{U,0}$ is the initial upper acceleration sensor measurement in a direction generally parallel to the axis 32, $HA_{L,0}$ is the initial lower acceleration sensor measurement in a direction substantially perpendicular to the axis 32 and having a component in a vertical plane (i.e., the lower high-side acceleration), and $HA_{U,0}$ is the initial upper acceleration sensor measurement in a direction substantially perpendicular to the axis 32 and having a component in a vertical plane (i.e., the upper high-side acceleration).

The co-variance matrix $\Sigma_0$ for the initial state at epoch k=0 can be expressed as the following:

$$\Sigma_0 = \begin{bmatrix} 0 & 0 & 0 & 0 & 0 \\ 0 & 0 & 0 & 0 & 0 \\ 0 & 0 & \sigma_D^2 & 0 & 0 \\ 0 & 0 & 0 & \sigma_I^2/B^2 & \sigma_I^2/(B\sqrt{2}) \\ 0 & 0 & 0 & \sigma_I^2/(B\sqrt{2}) & \sigma_I^2 \end{bmatrix};$$ (Eq. 6)

where $\sigma_D$ is the uncertainty in the initial depth of the lower acceleration sensor 50 and $\sigma_I$ is the uncertainty in the initial inclination of the lower acceleration sensor 50. The zero elements of the co-variance matrix $\Sigma_0$ result from the fact that the downhole portion 30 is initially stationary (i.e., acceleration and velocity both equal zero).

The state vector $X_{k-1}$ of epoch k−1 can be used to predict the state vector $X_k$ of a later epoch k using the following equations:

$$a_k = a_{k-1};$$ (Eq. 7)

$$v_k = v_{k-1} + a_{k-1} * \Delta t;$$ (Eq. 8)

$$D_k = D_{k-1} + v_{k-1} * \Delta t + (a_{k-1} * \Delta t^2)/2;$$ (Eq. 9)

$$d_k = d_{k-1};$$ (Eq. 10)

$$I_k = I_{k-1} + d_{k-1} * v_{k-1} * \Delta t;$$ (Eq. 11)

where Δt is the time period between epoch k−1 and epoch k. In addition, certain other embodiments utilize other equations which include higher-order terms to predict the state vector of epoch k based on an earlier state vector of epoch k−1.

The co-variance matrix $\chi$ for the predicted state vector is given by the following diagonal matrix:

$$\chi = \begin{bmatrix} (p_a/\alpha)^2 & 0 & 0 & 0 & 0 \\ 0 & (p_v/\alpha)^2 & 0 & 0 & 0 \\ 0 & 0 & (p_D/\alpha)^2 & 0 & 0 \\ 0 & 0 & 0 & (p_d/\alpha)^2 & 0 \\ 0 & 0 & 0 & 0 & (p_I/\alpha)^2 \end{bmatrix} \quad \text{(Eq. 12)}$$

where $p_a$ is the maximum change of acceleration over time period $\Delta t$, $p_v$ is the maximum change of velocity over time period $\Delta t$, $p_D$ is the maximum change of depth over time period $\Delta t$, $p_d$ is the maximum change of apparent dogleg over time period $\Delta t$, and $p_I$ is the maximum change of inclination over time period $\Delta t$. In certain embodiments, $p_a$ is assumed to be given by $p_a = 2p_D/(\Delta t)^2$. In certain embodiments, $p_v$ is assumed to be given by $p_v = p_D/\Delta t$. In certain embodiments, $p_d$ is assumed to be given by $p_d = 2p_I/B$.

The parameter $\alpha$ provides a multiplication factor between the standard deviation $\sigma$ of a state vector element and the maximum change $p$ of the state vector element, such that the maximum change of the state vector element can be expressed as $p = \alpha * \sigma$. In certain embodiments, the multiplication factor $\alpha$ is in a range between approximately 2 and approximately 5, and in other embodiments, the multiplication factor $\alpha$ is substantially equal to 3.

The acceleration sensors provide the following measurements at epoch k:

$$A_k = [A_{L,k} \; A_{U,k}]^T; \quad \text{(Eq. 13)}$$

where $A_{L,k}$ is the measurement from the lower acceleration sensor 50 and $A_{U,k}$ is the measurement from the upper acceleration sensor 40 at epoch k. The co-variance matrix corresponding to the acceleration sensor measurements at epoch k is provided by the following diagonal matrix:

$$\Psi_{A,k} = \begin{bmatrix} \sigma_{A_L,k}^2 & 0 \\ 0 & \sigma_{A_U,k}^2 \end{bmatrix}; \quad \text{(Eq. 14)}$$

where $\sigma_{A_L,k}$ is the uncertainty of the lower acceleration sensor measurements and $\sigma_{A_U,k}$ is the uncertainty of the upper acceleration sensor measurements. In certain embodiments, $\sigma_{A_L,k}$ is the same for all epochs, and $\sigma_{A_U,k}$ is the same for all epochs. In certain embodiments in which the two acceleration sensors are substantially identical, $\sigma_{A_L,k} = \sigma_{A_U,k}$.

As discussed more fully below, in certain embodiments, additional aiding data may be supplied. In certain embodiments, aiding velocity measurements [$V_k$] are provided with a corresponding co-variance matrix $\Psi_{V,k} = [\sigma_{V,k}^2]$, where $\sigma_{V,k}$ is the uncertainty of the aiding velocity measurements. In certain embodiments, aiding absolute-depth measurements [$S_k$] are provided with a corresponding co-variance matrix $\Psi_{S,k} = [\sigma_{S,k}^2]$, where $\sigma_{S,k}$ is the uncertainty of the aiding absolute-depth measurements. In certain embodiments, aiding relative-depth measurements [$R_k$] are provided with a corresponding co-variance matrix $\Psi_{R,k} = [\sigma_{R,k}^2]$, where $\sigma_{R,k}$ is the uncertainty of the aiding relative-depth measurements. Other aiding measurements can be used in accordance with embodiments described herein.

The theoretical acceleration sensor measurements can be calculated using the predicted state vector elements $a_k$ and $I_k$ in the following equations:

$$A'_{L,k} = a_k + g*\cos(I_k); \quad \text{(Eq. 15)}$$

$$A'_{U,k} = a_k + g*\cos(I_k - d_k*B); \quad \text{(Eq. 16)}$$

where $A'_{L,k}$ is the theoretical lower acceleration sensor measurement, $A'_{U,k}$ is the theoretical upper acceleration sensor measurement.

The equations which provide the predicted state vector at epoch k based on the state vector at epoch k-1 can be expressed as the following prediction matrix $\Phi_k$:

$$\Phi_k = \begin{bmatrix} 1 & 0 & 0 & 0 & 0 \\ \Delta t & 1 & 0 & 0 & 0 \\ (\Delta t)^2/2 & \Delta t & 1 & 0 & 0 \\ 0 & 0 & 0 & 1 & 0 \\ 0 & 0 & 0 & v_{k-1}*\Delta t & 1 \end{bmatrix}. \quad \text{(Eq. 17)}$$

In this way, the predicted state vector at epoch k can be expressed as $X_k = \Phi_k * X_{k-1}$.

The prediction matrix $\Phi_k$ can not be used for a prediction of the state co-variance matrix because it is non-linear (i.e., one of the state elements is included in the matrix). Instead, a linear prediction matrix $\Gamma_k$ can be used to update the state co-variance matrix, corresponding to the uncertainty of the new state vector, as follows:

$$\Sigma_k = \Gamma_k * \Sigma_{k-1} * \Gamma_k^T + \chi; \quad \text{(Eq. 18)}$$

where $\Gamma_k$ is given by the following:

$$\Gamma_k = \begin{bmatrix} 1 & 0 & 0 & 0 & 0 \\ \Delta t & 1 & 0 & 0 & 0 \\ (\Delta t)^2/2 & \Delta t & 1 & 0 & 0 \\ 0 & 0 & 0 & 1 & 0 \\ 0 & d_{k-1}*\Delta t & 0 & v_{k-1}*\Delta t & 1 \end{bmatrix}. \quad \text{(Eq. 19)}$$

Three matrices can be defined to be used to calculate updates of the state vector $X_k$ and the state co-variance matrix $\Sigma_k$ based on measurements. The design matrix $\alpha_{A,k}$ corresponds to the partial derivatives of the theoretical measurements and is given by the following:

$$\alpha_{A,k} = \begin{bmatrix} 1 & 0 & 0 & 0 & -g*\sin(I_{k-}) \\ 1 & 0 & 0 & \sin(I_{k-} - d_{k-}*B)*B & -\sin(I_{k-} - d_{k-}*B) \end{bmatrix}. \quad \text{(Eq. 20)}$$

The constant vector $\beta_{A,k}$ corresponds to the theoretical measurements minus the actual measurements and is given by the following:

$$\beta_{A,k} = \begin{bmatrix} A'_{L,k-} - A_{L,k} \\ A'_{U,k-} - A_{U,k} \end{bmatrix} \quad \text{(Eq. 21)}$$

$$= \begin{bmatrix} a_{k-} + g*\cos(I_{k-}) - A_{L,k} \\ a_{k-} + g*\cos(I_{k-} - d_{k-}*B) - A_{U,k} \end{bmatrix}.$$

The gain matrix $G_k$ is given by the following:

$$G_k = \Sigma_{k-} * \alpha_{A,k}^T (\Psi_{A,k} + \alpha_{A,k}*\Sigma_{k-}*\alpha_{A,k}^T)^{-1}. \quad \text{(Eq. 22)}$$

The after-measurement update of the state vector $X_k$ and the after-measurement update of the state co-variance matrix $\Sigma_k$ are calculated as follows:

$$X_k = X_{k-} - G_k * \beta_{A,k};  \quad \text{(Eq. 23)}$$

$$\Sigma_k = \Sigma_{k-} - G_k * \alpha_{A,k} * \Sigma_{k-}. \quad \text{(Eq. 24)}$$

where k- denotes the values of epoch k prior to the current update. Using such a labeling scheme, k- in Equations 20 through 24 denotes the values of the predicted state vector prior to the update using the acceleration measurements. Thus, $X_{k-}$ and $\Sigma_{k-}$ are the state vector and state co-variance matrix, respectively, of epoch k after the prediction but prior to the measurement update.

Aiding Data
 Stationary Data

In certain embodiments, the downhole portion 30 of the survey tool 10 is stopped within the wellbore 20 one or more times to obtain aiding data while the downhole portion 30 is stationary. In certain embodiments, the downhole portion 30 is stopped at one or more random or arbitrary times, while in other embodiments, the downhole portion 30 is stopped at multiple times with a predetermined period. In certain such embodiments which only have the first acceleration sensor 40 and the second acceleration sensor 50, the state vector $X_k$ and the co-variance matrix $\Sigma_k$ can be expressed as:

$$X_k = \begin{bmatrix} 0 & 0 & D_{L,k-} & d_{k-} & I_{L,k-} \end{bmatrix}^T; \quad \text{(Eq. 25)}$$

$$\Sigma_k = \begin{bmatrix} 0 & 0 & 0 & 0 & 0 \\ 0 & 0 & 0 & 0 & 0 \\ 0 & 0 & \Sigma_{33,k-} & \Sigma_{34,k-} & \Sigma_{35,k-} \\ 0 & 0 & \Sigma_{43,k-} & \Sigma_{44,k-} & \Sigma_{45,k-} \\ 0 & 0 & \Sigma_{53,k-} & \Sigma_{54,k-} & \Sigma_{55,k-} \end{bmatrix}; \quad \text{(Eq. 26)}$$

which in certain embodiments is given by:

$$\Sigma_k = \begin{bmatrix} 0 & 0 & 0 & 0 & 0 \\ 0 & 0 & 0 & 0 & 0 \\ 0 & 0 & \sigma_{D,k-}^2 & \sigma_{Dd,k-} & \sigma_{DI,k-} \\ 0 & 0 & \sigma_{dD,k-} & \sigma_{d,k-}^2 & \sigma_{dI,k-} \\ 0 & 0 & \sigma_{ID,k-} & \sigma_{Id,k-} & \sigma_{I,k-}^2 \end{bmatrix}; \quad \text{(Eq. 27)}$$

where k- in Equations 25 through 27 denotes the values of the various elements prior to the update using the aiding stationary data. In other such embodiments which have cross-axial acceleration sensors, the state vector $X_k$ and the co-variance matrix $\Sigma_k$ can be expressed using the following:

$$d_k = (\arctan(-HA_{L,k}/A_{L,k}) - \arctan(-HA_{U,k}/A_{U,k}))/B; \quad \text{(Eq. 28)}$$

$$I_k = \arctan(-HA_{L,k}/A_{L,k}); \quad \text{(Eq. 29)}$$

$$\Sigma_k = \begin{bmatrix} 0 & 0 & 0 & 0 & 0 \\ 0 & 0 & 0 & 0 & 0 \\ 0 & 0 & \Sigma_{33,k-} & 0 & 0 \\ 0 & 0 & 0 & \sigma_I^2/B^2 & \sigma_I^2/(B\sqrt{2}) \\ 0 & 0 & 0 & \sigma_I^2/(B\sqrt{2}) & \sigma_I^2 \end{bmatrix}; \quad \text{(Eq. 30)}$$

which in certain embodiments is given by:

$$\Sigma_k = \begin{bmatrix} 0 & 0 & 0 & 0 & 0 \\ 0 & 0 & 0 & 0 & 0 \\ 0 & 0 & \sigma_D^2 & 0 & 0 \\ 0 & 0 & 0 & \sigma_I^2/B^2 & \sigma_I^2/(B\sqrt{2}) \\ 0 & 0 & 0 & \sigma_I^2/(B\sqrt{2}) & \sigma_I^2 \end{bmatrix}. \quad \text{(Eq. 31)}$$

Velocity Data

In certain embodiments, aiding velocity data is provided by one or more supplementary sensors which are part of the downhole portion 30 of the survey tool 10. As described above in relation to FIG. 3, example supplementary sensors include, but are not limited to, gamma-ray sensors adapted to detect gamma rays from geological formations in proximity to the downhole portion 30 and magnetic sensors adapted to detect casing collars in proximity to the downhole portion 30. Such supplementary sensors do not continuously measure the velocity of the survey tool 10, but they detect landmark features which can be used to calculate the average velocity of the downhole portion 30 as the downhole portion 30 passes the landmark feature or between the locations of two or more selected landmark features.

Figure 5A:
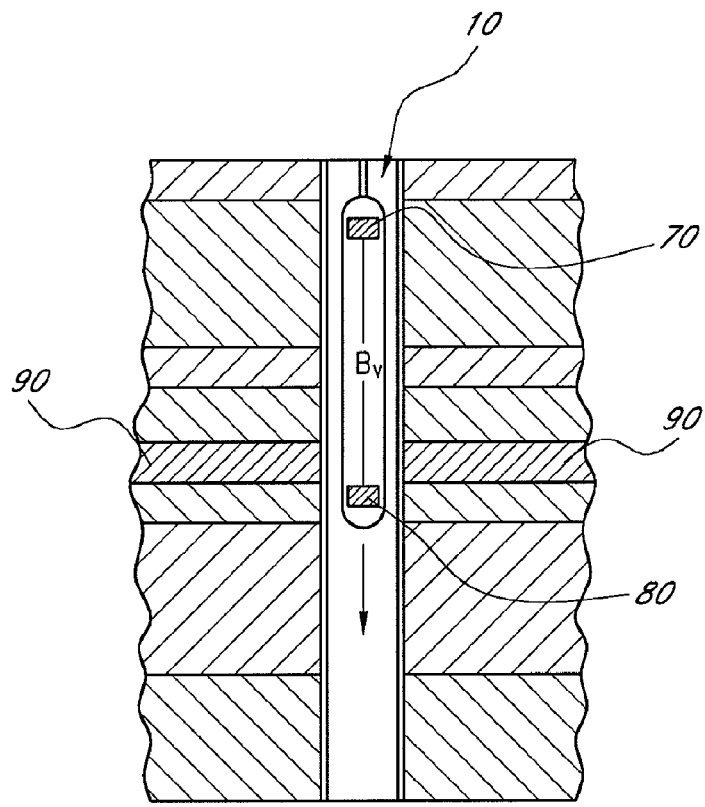
FIG. 5A schematically illustrates an example survey tool having a first supplementary sensor and a second supplementary sensor passing a landmark feature.
Figure 5B:
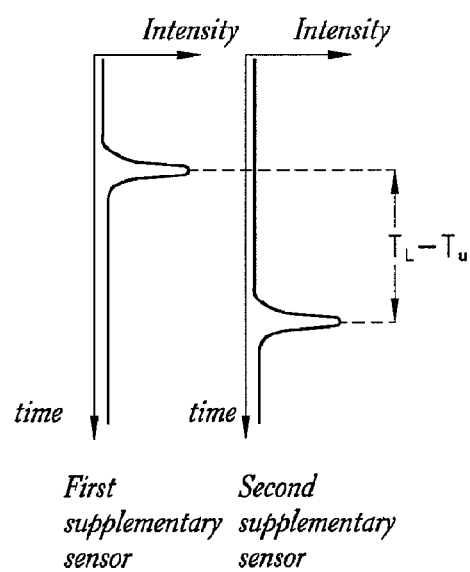
FIG. 5B is an example plot of the signals from the first supplementary sensor and the second supplementary sensor as a function of time.

FIG. 5A schematically illustrates a tool 10 having a first gamma-ray sensor 80 and a second gamma-ray sensor 70 with the downhole portion 30 moving past a geological formation 90 having a gamma-ray emission higher than the surrounding formations. FIG. 5B schematically illustrates the signals from the first gamma-ray sensor 80 and the second gamma-ray sensor 70 as functions of time. The first gamma-ray sensor 80 is lower than the second gamma-ray sensor 70, so the first gamma-ray sensor 80 detects the formation 90 before the second gamma-ray sensor 70 detects the same formation 90. By correlating the measurements of the two supplementary sensors, and knowing the distance $B_v$ between the two supplementary sensors, the average velocity of the downhole portion 30 as it passed the geological formation 90 can be calculated as follows:

$$V_k = B_v/(T_L - T_U); \quad \text{(Eq. 32)}$$

where $B_v$ is the distance between the first gamma-ray sensor 80 and the second gamma-ray sensor 70, $T_L$ is the time that the first gamma-ray sensor 80 detects the geological formation 90, and $T_U$ is the time that the second gamma-ray sensor 70 detects the geological formation 90. Similarly, two magnetic sensors of the downhole portion 30 can be used to determine an average velocity of the downhole portion 30 relative to a casing collar of the wellbore 20.

The measured velocity $V_k$ is the average velocity over the time interval ranging from $T_L$ to $T_U$. However, the average velocity approaches the instantaneous velocity as the time interval ($T_L$-$T_U$) approaches zero. In certain embodiments, the average velocity is used to analyze the state vector $X_k$. In certain other embodiments, the analysis of the state vector $X_k$ utilizes the instantaneous velocity at epoch k. In certain such embodiments, the distance $B_v$ is selected to be as small as possible without letting the noise or uncertainty in the two time measurements corrupt the measured velocity.

The uncertainty $\sigma_{V,k}$ in the measured velocity at epoch k depends on the instability of the velocity over the time interval between $T_L$ and $T_U$, and on the uncertainty in the repeated detection of the landmark feature being referenced. An estimate of the uncertainty of the measured velocity is given by:

$$\sigma_{V,k}^2 = (p_v * \alpha * (T_U - T_L)/\Delta t)^2 + 2\sigma_{det,k}^2/(T_U - T_L)^2; \quad \text{(Eq. 33)}$$

where $\sigma_{det,k}$ is the uncertainty in the detection of the actual location of the formation at epoch k, and $p_v$ is the maximum change of the velocity of the time period $\Delta t$ of the epoch k. In certain embodiments, $\sigma_{det,k}$ is constant among different epochs. In certain embodiments, the maximum change of the velocity over the time period $\Delta t$ is assumed to be equal to the maximum change of the depth $p_D$ divided by the time period $\Delta t$, where $\Delta t$ is small.

In certain embodiments in which such aiding velocity data is available, a design velocity vector $\alpha_{V,k}$ (corresponding to the partial derivatives of the theoretical velocity measurements which are equal to the current state velocity) and a constant velocity vector $\beta_{V,k}$ (corresponding to the theoretical measurements minus the actual measurements) can be expressed as:

$$\alpha_{V,k} = [0\ 1\ 0\ 0\ 0]; \tag{Eq. 34}$$

$$\beta_{V,k} = [v_k - V_k]. \tag{Eq. 35}$$

Using these two vectors, a gain velocity matrix $G_k$ can be expressed as:

$$G_k = \Sigma_{k-}*\alpha_{V,k}^T*(\Psi_{V,k} + \alpha_{V,k}*\Sigma_{k-}*\alpha_{V,k}^T)^{-1}; \tag{Eq. 36}$$

which can be used to express the state vector $X_k$ and the co-variance matrix $\Sigma_k$ as:

$$X_k = X_{k-} - G_k*\beta_{V,k}; \tag{Eq. 37}$$

$$\Sigma_k = \Sigma_{k-} - G_k*\alpha_{V,k}*\Sigma_{k-}; \tag{Eq. 38}$$

where k- in Equations 35 through 38 denotes the values of the various elements prior to the update using the aiding velocity data.

Absolute Depth

In certain embodiments in which the absolute depth of a landmark feature is known, the detection of this landmark feature by one or more sensors of the downhole portion 30 can be used to provide aiding data. In certain such embodiments, the time at which the landmark feature is passed by the downhole portion 30 is noted, and for the corresponding epoch k, the depth $S_k$ can be expressed as:

$$S_k = S_k^S + B^S; \tag{Eq. 39}$$

where $S_k^S$ is the depth of the landmark feature and $B^S$ is the distance between the lower acceleration sensor 50 and the supplementary sensor in proximity to the lower acceleration sensor 50 (e.g., the second gamma-ray sensor 80 as in FIG. 3).

In certain embodiments, one or more of the same supplementary sensors are used to provide both aiding velocity data and aiding absolute-depth data. In certain embodiments, two supplementary sensors are used to provide two separate absolute-depth measurements of the same landmark feature. In certain such embodiments, the two measured absolute depths, $S_k$ and $S_{k'}$, are related to two different epochs which are temporally close, and are related by the following:

$$S_k = S_k^S + B^{SL}; \tag{Eq. 40}$$

$$S_{k'} = S_{k'}^S + B^{SU}; \tag{Eq. 41}$$

where $B^{SL}$ is the distance between the lower acceleration sensor 50 and the second supplementary sensor (e.g., the second gamma-ray sensor 80 as in FIG. 3), and $B^{SU}$ is the distance between the lower acceleration sensor 50 and the first supplementary sensor (e.g., the first gamma-ray sensor 70 as in FIG. 3).

The uncertainty $\sigma_{S,k}$ of the absolute-depth measurements at epochs k and k' depends on both the uncertainty in the given value of the absolute depth of the landmark feature and the uncertainty in the detection of the landmark feature by the supplementary sensor. The uncertainty of the absolute-depth measurement can be expressed as follows:

$$\sigma_{S,k}^2 = \sigma_{det,k}^2 + \sigma_{given,k}^2; \tag{Eq. 42}$$

where $\sigma_{det,k}$ is the uncertainty in the detection of the landmark feature and $\sigma_{given,k}$ is the uncertainty in the given value of the absolute depth of the landmark feature. In certain embodiments, $\sigma_{det,k}$ is constant for different epochs.

In certain embodiments in which aiding absolute-depth data is available, a design absolute-depth vector $\alpha_{S,k}$, a constant absolute-depth vector $\beta_{S,k}$, and a gain absolute-depth matrix $G_k$ can be used to express the state vector $X_k$ and the co-variance matrix $\Sigma_k$ as follows:

$$\alpha_{S,k} = [0\ 0\ 1\ 0\ 0]; \tag{Eq. 43}$$

$$\beta_{S,k} = [D_k - S_k]. \tag{Eq. 44}$$

$$G_k = \Sigma_{k-}*\alpha_{S,k}^T*(\Psi_{S,k} + \alpha_{S,k}*\Sigma_{k-}*\alpha_{S,k}^T)^{-1}; \tag{Eq. 45}$$

$$X_k = X_{k-} - G_k*\beta_{S,k}; \tag{Eq. 46}$$

$$\Sigma_k = \Sigma_{k-} - G_k*\alpha_{S,k}*\Sigma_{k-}; \tag{Eq. 47}$$

where k- in Equations 44 through 47 denotes the values of the various elements prior to the update using the aiding absolute-depth data.

Relative Depth

In certain embodiments, the downhole portion 30 provides relative-depth data which does not depend on the known depths of landmark features. In certain embodiments, such relative-depth data is provided by two supplementary sensors adapted to provide large and sharp signal spikes at landmark locations. In certain embodiments, these landmark locations are previously known, while in other embodiments, these landmark locations are previously unknown. In certain embodiments, the relative-depth data is provided by a similar configuration of two supplementary sensors of the downhole portion 30 as that which provides the aiding velocity data described above. However, while the velocity data is advantageously provided by two supplementary sensors which are relatively close together, the relative-depth data is advantageously provided by two supplementary sensors which are farther apart from one another.

In certain embodiments, the epoch k is defined to be the epoch during which the second supplementary sensor (e.g., the second gamma-ray sensor 80 of FIG. 3) passes a detectable landmark location and the epoch k' is defined to be the epoch during which the first supplementary sensor (e.g., the first gamma-ray sensor 70 of FIG. 3) passes the same detectable landmark location. The aiding relative-depth measurement $R_k$ at epoch k of certain embodiments can be expressed as:

$$R_k = D_{k'} + B^r + B^a; \tag{Eq. 48}$$

where $D_{k'}$ is the calculated depth of the downhole portion 30 at epoch k', $B^r$ is the distance between the first supplementary sensor and the second supplementary sensor (e.g., the two gamma-ray sensors 70, 80 of FIG. 3), and $B^a$ is the distance between the second acceleration sensor 50 and the second supplementary sensor (e.g., the second gamma-ray sensor 80 of FIG. 3).

In certain embodiments, the uncertainty in the relative-depth measurement at epoch k depends on both the uncertainty of the calculated depth at epoch k' and the uncertainty in the relative depth detection. The uncertainty in the relative-depth measurement can be expressed as follows:

$$\sigma_{R,k}^2 = \sigma_{rel}^2 + \sigma_{last,k}^2; \tag{Eq. 49}$$

where $\sigma_{rel}$ is the uncertainty in the relative-depth detection for the landmark location and $\sigma_{last,k}$ is the uncertainty of the calculated depth at epoch k. In certain embodiments, $\sigma_{last,k}$ is given by the third diagonal element $(\Sigma_{33,k'})$ of the solution co-variance matrix at epoch k'. In certain embodiments, $\sigma_{last,k}$ is equal to $\sigma_D$, which is the uncertainty in the depth measurement.

In certain embodiments in which aiding relative depth data is available, a design relative-depth vector $\alpha_{R,k}$, a constant relative-depth vector $\beta_{R,k}$, and a gain relative-depth matrix $G_k$ can be used to express the state vector $X_k$ and the co-variance matrix $\Sigma_k$ as follows:

$$\alpha_{R,k} = [0\ 0\ 1\ 0\ 0]; \quad \text{(Eq. 50)}$$

$$\beta_{R,k} = [D_k - R_k]. \quad \text{(Eq. 51)}$$

$$G_k = \Sigma_{k-} * \alpha_{R,k}^T * (\Psi_{R,k} + \alpha_{R,k} * \Sigma_{k-} * \alpha_{R,k}^T)^{-1}; \quad \text{(Eq. 52)}$$

$$X_k = X_{k-} - G_k * \beta_{R,k}; \quad \text{(Eq. 53)}$$

$$\Sigma_k = \Sigma_{k-} - G_k * \alpha_{R,k} * \Sigma_{k-}; \quad \text{(Eq. 54)}$$

where k- in Equations 51 through 54 denotes the values of the various elements prior to the update using the aiding relative-depth data.

Bend Data

Certain embodiments described above may experience limited system performance. For example, in an open wellbore, the passage of the tool past a formation feature exhibiting a significant formation radiation variation can be detected by a pair of gamma-ray detectors spaced a known distance apart along the tool string. However, in certain embodiments, the radiation signal variation can be small, e.g., when passing through a large uniform section of formation, or when drilling parallel to the formation strata (as is done in the construction of an extended reach wellbore. Under such conditions, the performance of the depth system in certain embodiments may degrade substantially and the accuracy of the depth estimates generated may be poor. In addition, while the passage of the tool past a casing joint can provide a well-defined magnetic disturbance that can be detected by a pair of CCLs spaced a known distance apart along the tool string, such CCLs are of limited use in open wellbores not having the casing joints. Certain embodiments described below advantageously overcome such limitations.

Figure 6:
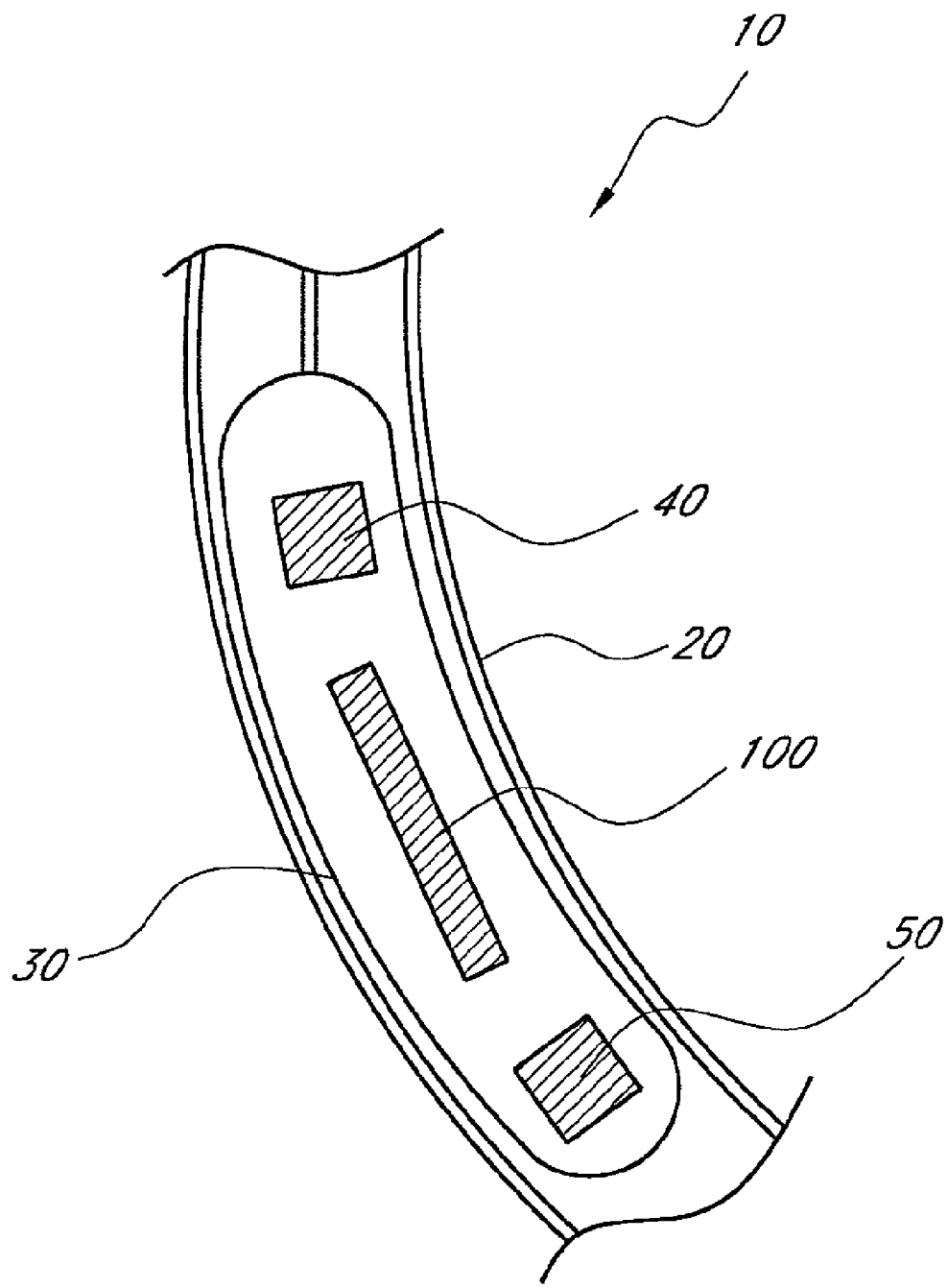
FIG. 6 schematically illustrates an example survey tool having a bend sensor between the first supplementary sensor and the second supplementary sensor in accordance with certain embodiments described herein.

FIG. 6 schematically illustrates an example survey tool 10 in accordance with certain embodiments described herein. The survey tool 10 has a bend sensor 100 which generates a third signal indicative of an amount of bend of at least a portion of the downhole portion 30. In certain embodiments, the bend sensor 100 is between the first supplementary sensor 40 and the second supplementary sensor 50. As shown in FIG. 6, the bend sensor 100 can be located approximately midway or equidistant between the first acceleration sensor 40 and the second acceleration sensor 50. The amount of bend or well curvature in certain embodiments can be used to enhance the measurement accuracy of estimations of acceleration, velocity, and along-hole position or depth as the downhole portion 30 traverses the path of the wellbore 20.

The bend sensor 100 of certain embodiments can determine the curvature of the downhole portion 30 using various methods by measuring a physical characteristic of the downhole portion 30 that changes as the downhole portion 30 bends. For example, the bend sensor 100 of certain embodiments is sensitive to mechanical strain in a part of the downhole portion 30 produced upon bending a part of the downhole portion 30 (e.g., a tubular casing of the downhole portion 30). In certain embodiments, the bend sensor 100 is sensitive to deformation, deflection, or movement of at least a part of the downhole portion 30 relative to another part of the downhole portion 30. In certain embodiments, the bend sensor 100 comprises one or more piezoelectric or piezoresistive elements which are mounted in the downhole portion 30 and which expand or contract in response to bending of the downhole portion 30. In certain other embodiments, the bend sensor 100 provides ultrasonic measurements of the tubular casing as it bends. In certain other embodiments, the bend sensor 100 comprises a foil-type sensor comprising a metallic foil pattern supported by an insulated flexible backing. Deformation of the foil causes its electrical resistance to change, which can be measured (e.g., by a Wheatstone bridge) and the measured resistance is related to the mechanical strain which causes the deformation. Other types of bend sensors 100 are also compatible with various embodiments described herein.

Figure 7A:
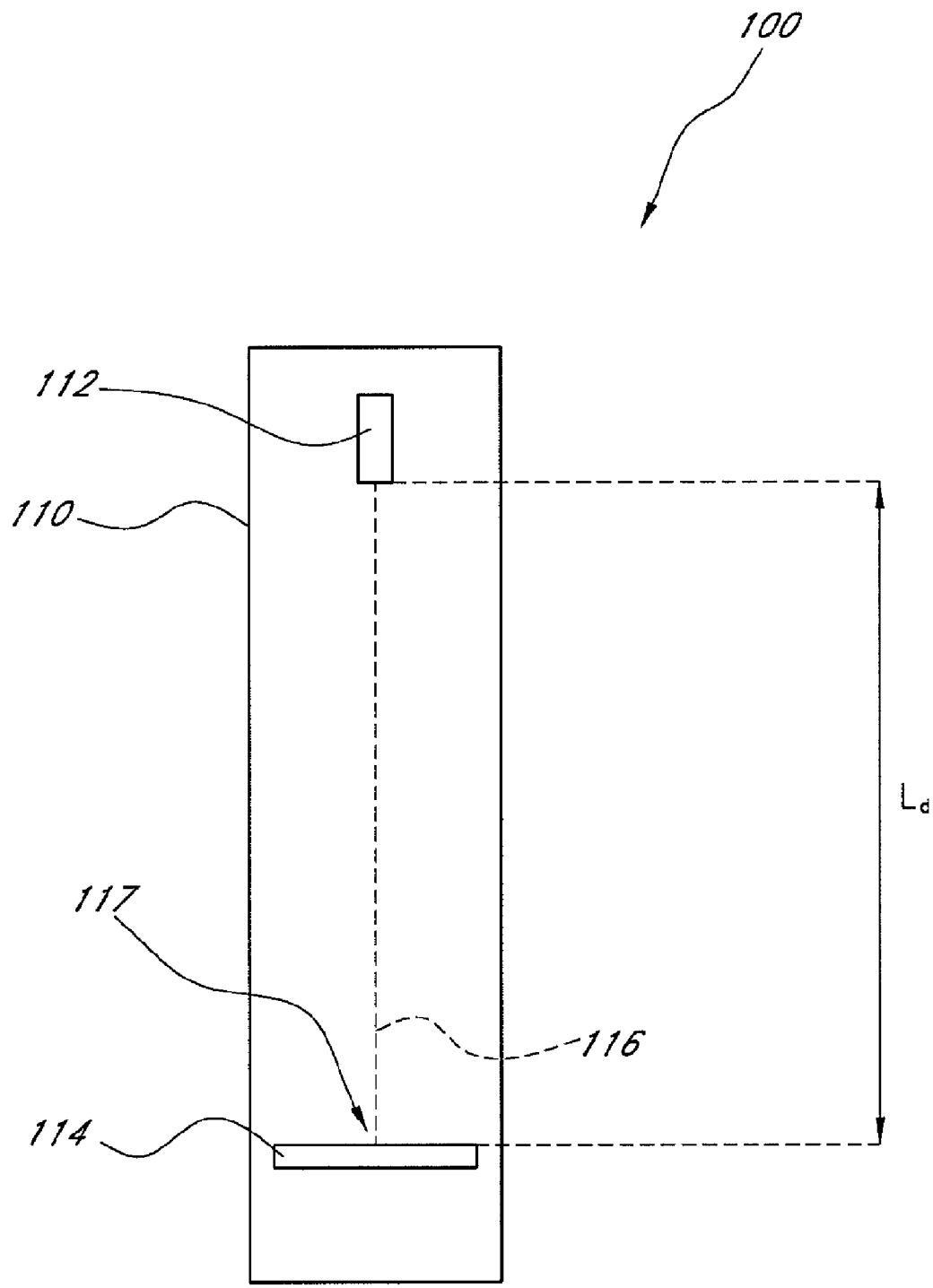
FIGS. 7A and 7B schematically illustrate an example bend sensor utilizing a laser beam and a light sensitive target in an unbent and a bent configuration, respectively, in accordance with certain embodiments described herein.
Figure 7B:
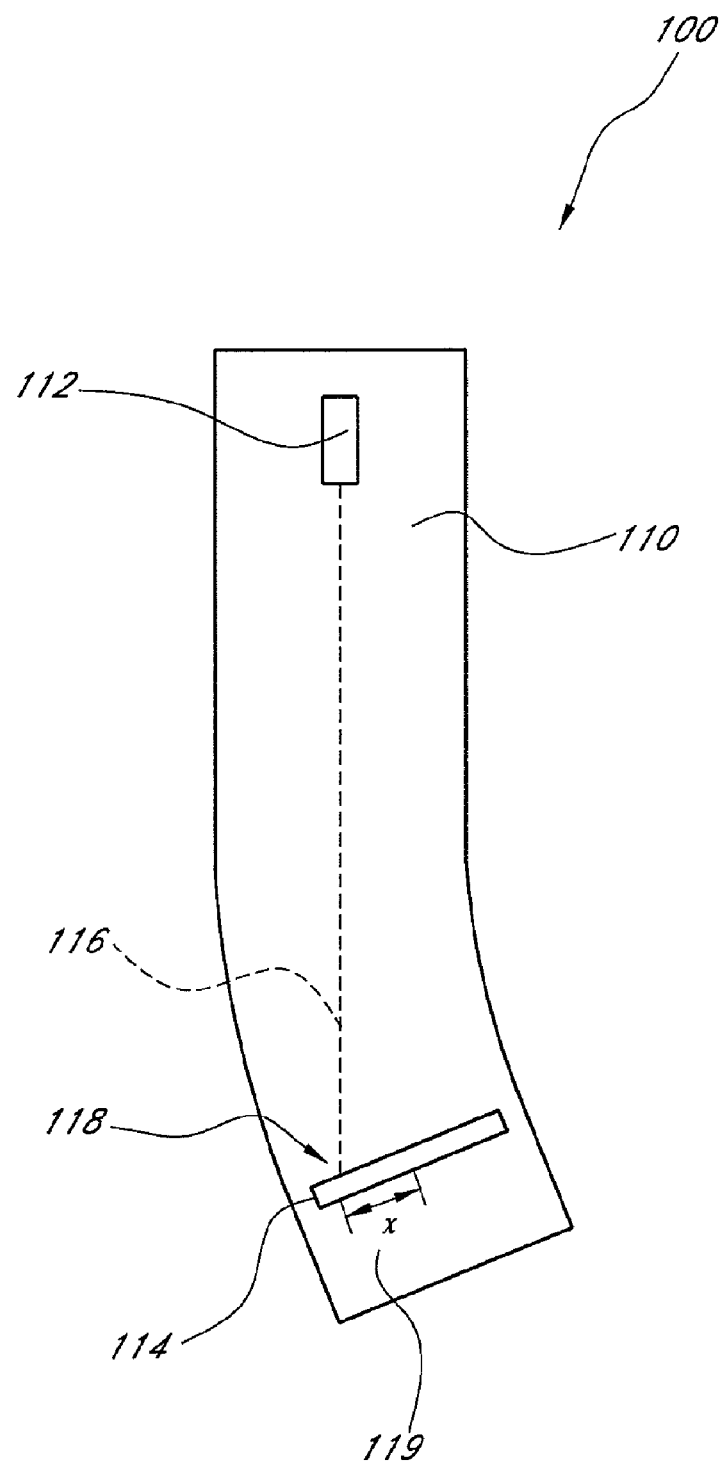

In certain embodiments, the bend sensor 100 includes an optical system 110 responsive to bending of the downhole portion 30, as schematically illustrated by FIGS. 7A and 7B. The optical system 110 of certain embodiments includes a light source 112 and a light detector 114 separated from the light source 112 by a non-zero distance $L_d$ along the wellbore 20. In certain embodiments, the light source 112 comprises either a light-emitting diode or a semiconductor laser diode which emits a narrow light beam 116 that impinges on the light detector 114. In certain embodiments, the light detector 114 comprises a photosensor which generates a signal indicative of the position at which the light beam 116 impinges the on light detector 114. Examples of photodetectors compatible with certain embodiments described herein include, but are not limited to, arrays of photoresistors, photovoltaic cells, photodiodes, and charge-coupled devices (CCDs). The optical components are advantageously both mechanically rugged and capable of operating at the high temperatures that can be expected downhole during drilling and well survey operations (e.g., 150° C. or more). In certain embodiments, the non-zero distance $L_d$ between the light source 112 and the light detector 114 is greater than about 2 meters, while in certain other embodiments, the non-zero distance $L_d$ is in a range between about 1 meter and about 3 meters.

As illustrated schematically by FIG. 7A, when the optical system 110 is in an unbent state (e.g., when the downhole portion 30 is in a relatively straight section of the wellbore 20), the light 116 impinges upon a first portion 117 of the light detector 114. In certain embodiments, the first portion 117 is approximately at the center of the light detector 114. As schematically illustrated by FIG. 7B, when the optical system 110 is in a bent state (e.g., when the downhole portion 30 is in a curved portion of the wellbore 20) however, the light 116 impinges on a second portion 118 of the light detector 104. In certain embodiments, the second portion 118 is displaced from the center of the light detector 114. The displacement 119 between the first portion 117 and the second portion 118 is dependent on the amount of bend of the bend sensor 100 (e.g., between the portion of the downhole portion 30 containing the light source 112 and the portion of the downhole portion 30 containing the light detector 114. In certain embodiments, the bend sensor 100 generates the third signal in response to the distance 119 between the first portion 117 and the second portion 118. In certain other embodiments, the bend sensor 100 generates the third signal in response to the position of the second portion 118.

The laser beam 116 of certain embodiments is directed generally parallel to the downhole portion 30 when the downhole portion 30 is in a relatively straight section of the wellbore 20, as shown schematically by FIG. 7A. In certain such embodiments, the laser beam 116 is generally collinear with a longitudinal axis of the downhole portion 30. In certain other embodiments, the laser beam 116 is directed generally non-parallel to the downhole portion 30 when the downhole portion 30 is in a relatively straight section of the wellbore 20.

In certain embodiments in which the downhole portion 30 bends uniformly with the curvature of the wellbore 20, the displacement 119 between the second portion 118 and the first portion 117 is proportional to the bend of the downhole portion 30, and hence provides a direct measure of the well dogleg curvature, D. For small angles of curvature, the dogleg curvature D can be expressed in terms of the displacement 119 (represented by x) and the separation, $L_d$, between the light source 112 and the light detector 114 as $D \approx 2x/L_d$. Thus, in certain embodiments, the signal generated by the light detector 114 can be used with the known distance between the light source 112 and the light detector 114 to calculate the well dogleg curvature D.

While FIGS. 7A and 7B schematically illustrate an example optical system 110 compatible with certain embodiments described herein, other optical systems are also compatible with certain embodiments described herein. For example, a commercial system, known as MAXIBOR® marketed by Reflex Instrument AB, may be adapted to provide the required measurement information in accordance with certain embodiments described herein. Other example optical systems 110 using interferometry (e.g., as described by U.S. Pat. Nos. 6,023,325 and 5,946,094, both of which are incorporated in their entireties by reference herein) can be used to measure curvature in accordance with certain embodiments described herein.

In certain embodiments, the third signal generated by the bend sensor 100 is indicative of an amount of bend in each of two generally orthogonal vertical planes. The components of the displacement 119 in each of these two planes can be used to determine the amount of bend in each of these planes. For example, FIG. 7B schematically shows the bend sensor 100 bent along a first direction in a first vertical plane and having a displacement 119 (represented by x) along the light detector 114 in the first plane. Similarly, the bend of the bend sensor 100 in a second vertical plane generally orthogonal to the first vertical plane can be measured by detecting a displacement y along a second direction generally orthogonal to the first direction.

In certain embodiments, the accelerometer measurements made by the first and second acceleration sensors 40, 50 while the downhole portion 30 is at two positions can be used to provide an estimate of the bend of the downhole portion 30 in a vertical plane defined by the two positions. In contrast, the bend sensor 100 according to certain embodiments described herein advantageously measures the total curvature of the downhole portion 30, regardless of the vertical plane defined by the positions at which accelerometer measurements are made. The estimates of the bend in the vertical plane of the two accelerometer measurement positions and in the total curvature can be compared to one another in certain embodiments as part of a wellbore drilling system control algorithm. While any bending out of the vertical plane defined by the two accelerometer measurement positions is typically small as compared to bending in this vertical plane, certain embodiments advantageously allow the components of the bend in this plane and orthogonal to this plane to be calculated and compared as part of the system control algorithm. In certain embodiments, the device is configured to separate the components of the bend in two directions with respect to the principal axes of the tool 10. Based on the accelerometer measurements and their mounting orientation with respect to the principal axes of the tool 10, the vertical and horizontal components of the bend may then be calculated. The vertical component measurement or both of the two bend component measurements can then be used in certain embodiments as input to the wellbore drilling system control algorithm to direct the drilling system in a desired direction.

In certain embodiments, the survey tool 10 has a controller 60 to calculate a depth, a velocity, or both a depth and a velocity of the downhole portion 30 in response to the first, second, and third signals. In certain embodiments, the measurements are taken simultaneously by the first acceleration sensor 40, the second acceleration sensor 50, and the bend sensor 100. In certain other embodiments, the controller accepts simultaneous measurements from the first and second acceleration sensors 40, 50 and the bend sensor 100, all of which are taken at regular intervals of time. Both accelerometer and dogleg measurements can be utilized at the same instants of time, which simplifies the control algorithm and can enhance its effectiveness by reducing the effect of accelerometer correlations at the main updates. In certain embodiments, the combination of dual accelerometer measurements with aiding data from the bend sensor 100 allows accurate estimates of the depth and velocity of the survey tool 10 to be generated as it travels along the wellbore.

Figure 8:
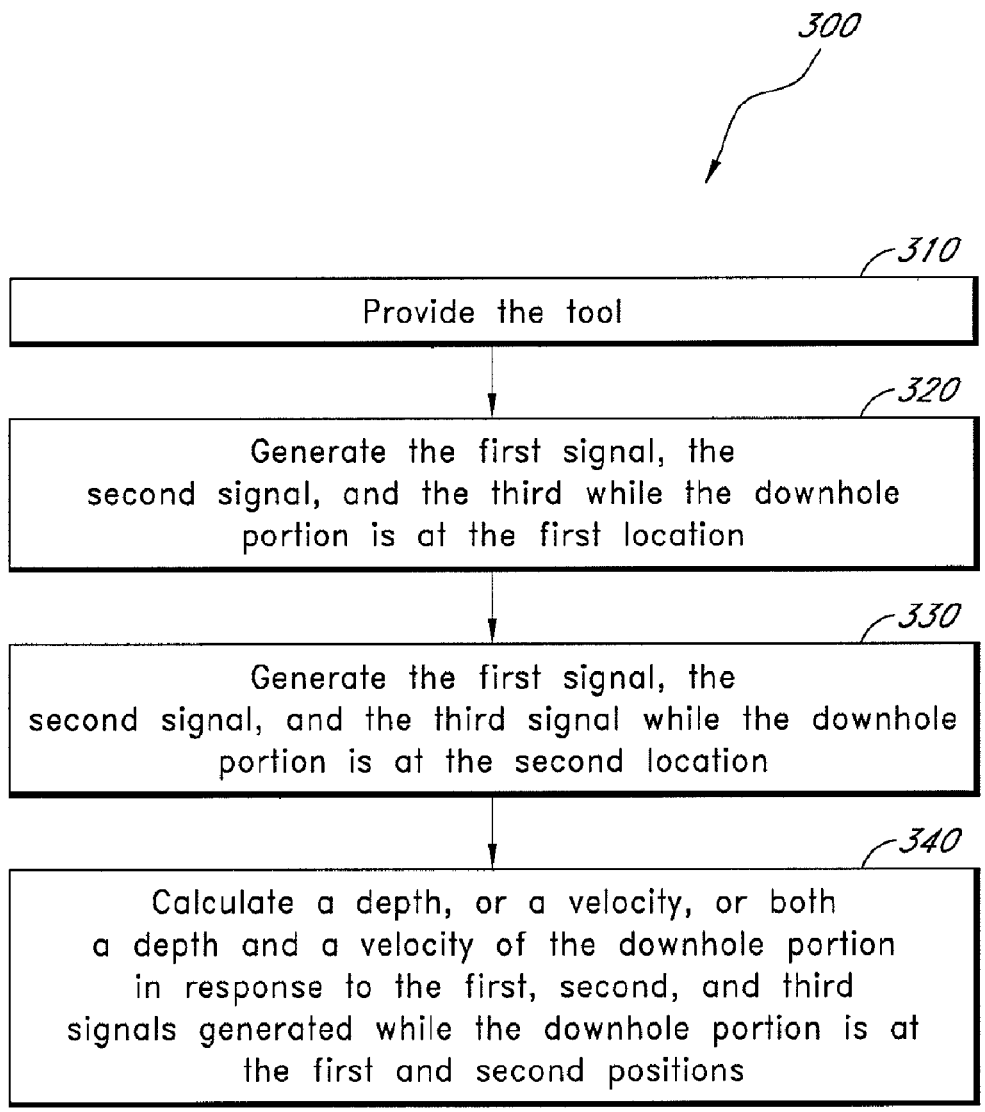
FIG. 8 is a flowchart of an example method of determining a depth of a downhole portion of a survey tool having a bend sensor in accordance with certain embodiments described herein.

FIG. 8 shows a flowchart of an example method 300 of determining a depth or a velocity, or both a depth and a velocity of a downhole portion 30 of a tool 10 movable within a wellbore 20 in accordance with certain embodiments described herein. The method 300 comprises providing a tool 10 in an operational block 310. The tool 10 comprises a downhole portion 30 movable within the wellbore 20 in a direction generally parallel to the wellbore 20. The tool 10 further comprises a first acceleration sensor 40 mounted at a first position within the downhole portion 30. The first acceleration sensor 40 generates a first signal indicative of a first acceleration in a first direction generally parallel to the wellbore 20 at the first position. The tool 10 further comprises a second acceleration sensor 50 mounted at a second position within the downhole portion 30. The second acceleration sensor 50 generates a second signal indicative of a second acceleration in a second direction generally parallel to the wellbore 20 at the second position. The tool 10 further comprises a bend sensor 100 generating a third signal indicative of an amount of bend of at least a portion of the downhole portion 30.

The method 300 further comprises generating the first signal, the second signal, and the third signal while the downhole portion 30 is at the first location within the wellbore 20 in an operational block 320. The method 300 further comprises generating the first signal, the second signal, and the third signal while the downhole portion 30 is at the second location within the wellbore 20 in an operational block 330. The method 300 further comprises calculating a depth, or a velocity, or both a depth and a velocity, of the downhole portion 30 of the tool 10 in response to the first, second, and third signals generated while the downhole portion 30 is at the first location and the first, second, and third signals generated while the downhole portion 30 is at the second location.

Figure 9:
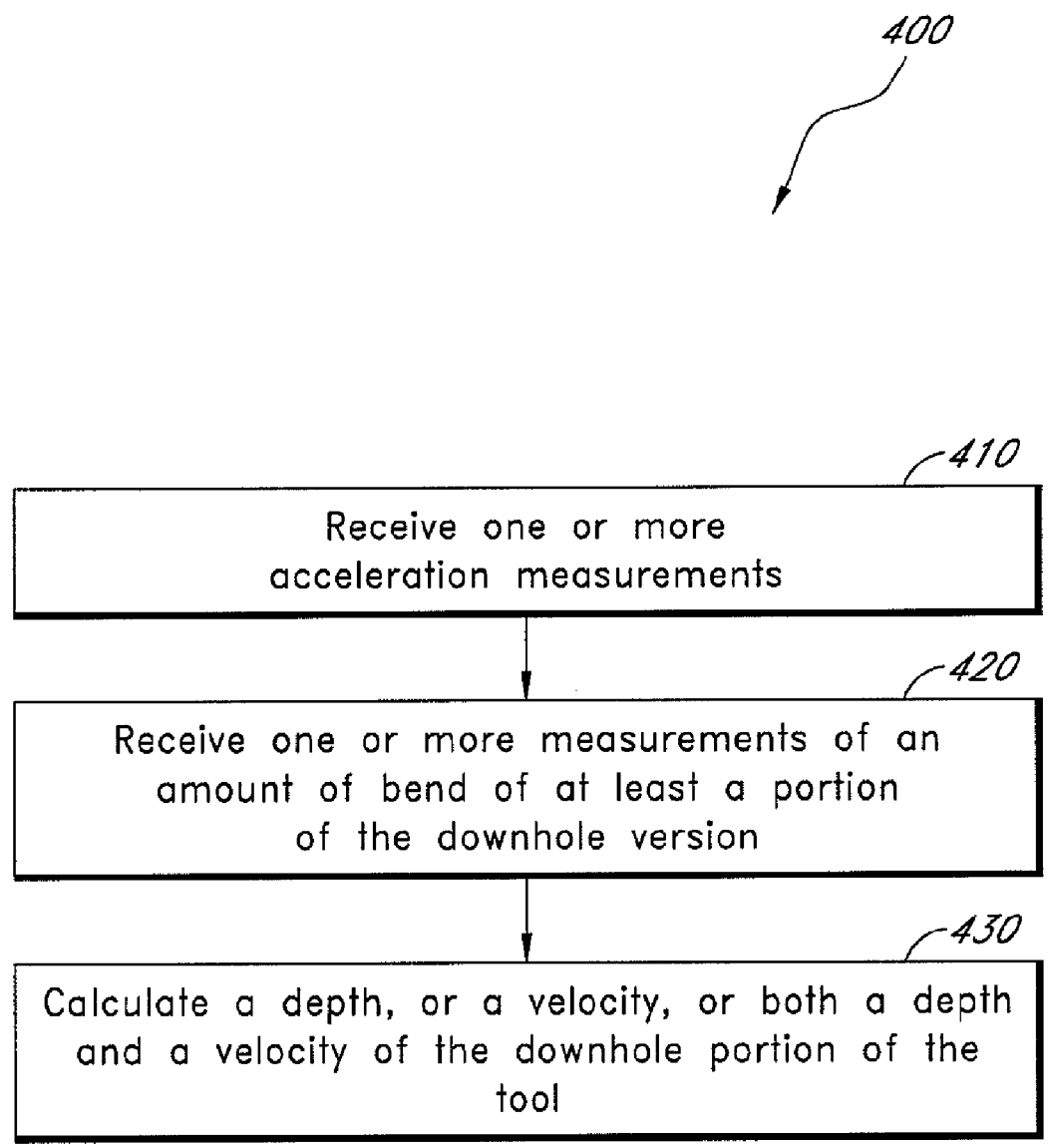
FIG. 9 is a flowchart of an example method of determining a velocity of a downhole portion of a survey tool having a bend sensor in accordance with certain embodiments described herein.

FIG. 9 is a flowchart of an example method 400 of determining a depth or a velocity, or both a depth and a velocity of a downhole portion 30 of a tool 10 movable within a wellbore 200 in accordance with certain embodiments described herein. The method 400 comprises receiving one or more acceleration measurements from at least one acceleration sensor in the downhole portion 30 of the tool 10 in an operational block 410. The method 400 further comprises receiving one or more measurements of an amount of bend of at least a portion of the downhole portion 30 in an operational block

420. The method 400 further comprises calculating a depth, or a velocity, or both a depth and a velocity of the downhole portion 30 of the tool 10 in response to the one or more acceleration measurements and the one or more measurements of the amount of bend.

As with the example embodiment described above, another example embodiment is described below in which the periodicity of the measurements from the two accelerometers define time periods or "epochs" whereby one set of accelerometer measurements are taken at every epoch k. Aiding data from the bend sensor 100 is advantageously included in certain embodiments at a subset of these epochs to enhance the resultant accuracy of the results. For example, the dogleg at epoch k, $d_k$, when epoch k is an acceleration/dogleg update epoch, may be determined from a single dogleg measurement or by averaging a number of dogleg measurements obtained at discrete intervals between the last and current measurement update time. The uncertainty in the dogleg measurement at epoch k, $\sigma_{d,k}$, is dependent on the instability of the bend sensor 100 over the time interval of the epoch k (e.g., from $t_l$ to $t_u$).

ANOTHER EXAMPLE EMBODIMENT

Utilizing Dogleg Data

The example embodiment described below calculates the depth, the velocity, or both the depth and the velocity of the downhole portion 30 using a recursive estimation algorithm employing measurements obtained at multiple locations to update estimates of the depth, the velocity, or both the depth and the velocity of the downhole portion 30. The state vector $X_k$ and the state co-variance matrix at epoch k can be expressed by Equations 1 and 2, respectively. The co-variance matrix $\Sigma_0$ for the initial state at epoch k=0 can be expressed as the following:

$$\Sigma_0 = \begin{bmatrix} 0 & 0 & 0 & 0 & 0 \\ 0 & 0 & 0 & 0 & 0 \\ 0 & 0 & \sigma_D^2 & 0 & 0 \\ 0 & 0 & 0 & \sigma_d^2 & 0 \\ 0 & 0 & 0 & 0 & \sigma_I^2 \end{bmatrix};$$ (Eq. 55)

where $\sigma_D$ is the uncertainty in the initial depth of the lower acceleration sensor 50, $\sigma_d$ is the uncertainty in the initial dogleg, and $\sigma_I$ is the uncertainty in the initial inclination of the lower acceleration sensor 50. The zero elements of the co-variance matrix $\Sigma_0$ result from the fact that the downhole portion 30 is initially stationary (i.e., acceleration and velocity both equal zero).

Equations 7 through 11 can be used to predict the state vector $X_k$ of a later epoch k from the state vector $X_{k-1}$ of epoch k−1. The co-variance matrix $\chi$ for the predicted state vector is given by the diagonal matrix of Equation 12.

The acceleration sensors 40, 50 and the bend sensor 100 provide the following measurements at epoch k:

$$A_k = [A_{L,k}\, A_{U,k}\, d_k]^T;$$ (Eq. 56)

where $A_{L,k}$ is the measurement from the lower acceleration sensor 50, $A_{U,k}$ is the measurement from the upper acceleration sensor 40 at epoch k, and $d_k$ is the measurement from the bend sensor 100.

The co-variance matrix corresponding to the measurements at epoch k is provided by the following diagonal matrix:

$$\Psi_{A,k} = \begin{bmatrix} \sigma_{A_L,k}^2 & 0 & 0 \\ 0 & \sigma_{A_U,k}^2 & 0 \\ 0 & 0 & \sigma_d^2 \end{bmatrix};$$ (Eq. 57)

where $\sigma_{A_L,k}$ is the uncertainty of the lower acceleration sensor measurements, $\sigma_{A_U,k}$ is the uncertainty of the upper acceleration sensor measurements, and $\sigma_d$ is the uncertainty of the bend sensor measurements. In certain embodiments, $\sigma_{A_L,k}$ is the same for all epochs, $\sigma_{A_U,k}$ is the same for all epochs, and $\sigma_d$ is the same for all epochs. In certain embodiments in which the two acceleration sensors are substantially identical, $\sigma_{A_L,k} = \sigma_{A_U,k}$.

The theoretical acceleration sensor measurements can be calculated using the predicted state vector elements $a_k$ and $I_k$ in the following equations:

$$A'_{L,k} = a_k + g^* \cos(I_{k-1});$$ (Eq. 58)

$$A'_{U,k} = a_k + g^* \cos(I_{k-1} - d_{k-1}{}^*B);$$ (Eq. 59)

$$d'_k = d'_{k-1};$$ (Eq. 60)

where $A'_{L,k}$ is the theoretical lower acceleration sensor measurement, $A'_{U,k}$ is the theoretical upper acceleration sensor measurement, and $d'_{k-1}$ is the theoretical dogleg measurement. The predicted state vector at epoch k can be expressed as $X_k = \Phi_k * X_{k-1}$, using the prediction matrix of Equation 17, and the linear prediction matrix of Equation 19 can be used in Equation 18 to update the state co-variance matrix.

The design matrix $\alpha_{A,k}$ corresponds to the partial derivatives of the theoretical measurements and is given by the following:

$$\alpha_{A,k} = \begin{bmatrix} 1 & 0 & 0 & 0 & -g*\sin(I_k) \\ 1 & 0 & 0 & g*\sin(I_k - d_k*B)*B & -g*\sin(I_k - d_k*B) \\ 0 & 0 & 0 & 1 & 0 \end{bmatrix}.$$ (Eq. 61)

The constant vector $\beta_{A,k}$ corresponds to the theoretical measurements minus the actual measurements and is given by the following:

$$\beta_{A,k} = \begin{bmatrix} a_k + g*\cos(I_k) - A_{L,k} \\ a_k + g*\cos(I_k - d_k*B) - A_{U,k} \\ d'_k - d_k \end{bmatrix}.$$ (Eq. 62)

The gain matrix $G_k$ is given by the following:

$$G_k = \Sigma_k * \alpha_{A,k}{}^T * (\Psi_{A,k} + \alpha_{A,k} * \Sigma_k * \alpha_{A,k}{}^T)^{-1}.$$ (Eq. 63)

The after-measurement update of the state vector $X_k$ and the after-measurement update of the state co-variance matrix $\Sigma_k$ are calculated as shown in Equations 23 and 24.

Other types and/or combinations of aiding data can also be used in addition to the bend or dogleg data in certain other embodiments. In certain embodiments, the aiding data can include the rate of change of the dogleg measurements. In certain embodiments, the aiding data can include the inclination determination based on summation of vertical components of the measured dogleg increments.

Certain embodiments described herein advantageously address the long-standing problem of inaccurate wellbore depth measurements by providing accurate and reliable depth measurements in a wellbore for use in various aspects of oil exploration and production. Certain embodiments described herein advantageously provide the depth and velocity of a package of geophysical and navigational instruments in real time as the package is lowered and/or raised in a borehole, without making use of any surface measurements. Certain such embodiments provide a measure of depth based entirely on the use of down-hole sensors, and are independent of any surface measurement devices, including wire-line depth, wire-line velocity, or pipe tally depth measurements, each of which is subject to error in the detection of true down-hole location and movement.

In certain embodiments, acceleration is sensed along the length of the wellbore (e.g., in the z-direction) and is corrected for the gravity component to yield an estimate of the acceleration with respect to the wellbore. This quantity can be integrated once to yield an estimate of along-hole velocity and integrated a second time to obtain an estimate of depth along the wellbore. In a curved section of the wellbore, the two accelerometers of certain embodiments nominally generate the same measurement when at the same location within the wellbore, thus providing an indication of when the tool has traveled the known separation distance between the two accelerometers.

In certain embodiments, a processing algorithm based on a mathematical model of the along-hole trajectory is used to provide estimates of the acceleration, velocity, depth, well curvature (dogleg), and inclination of the wellbore. The measurements generated by the two accelerometers in certain embodiments can be compared with estimates of the same quantities derived from the states of the model. These measurement differences can form the inputs to the processing algorithm which effectively cause the outputs of the model to be driven into coincidence with the measurements, thus correcting the outputs of the model.

In certain embodiments, the estimates of wellbore depth in dogleg wellbore sections are substantially improved by utilizing additional pairs of sensors (e.g., gamma-ray sensors, casing collar locators or CCLs, gyroscopes, and/or accelerometers) built into the tool string to aid the measurement process as the tool string moves along the wellbore by detecting small but often distinct mechanical disturbances. By using pairs of sensors mounted a known distance apart along the tool string, certain embodiments can detect the same formation feature (and/or casing joint in the case of CCLs). The known separation between the two sensors can be used in certain embodiments to extract either a measured speed of the tool along the wellbore, or the incremental distance moved as the two sensors pass the same point in the well at different times. In certain such embodiments, the measurements are affected by the timing resolution of the respective measurements by each sensor to accurately resolve the time elapsed between the second sensor detecting a feature and the earlier detection of the feature by the first sensor.

In certain embodiments, the estimates of acceleration, velocity, and along-hole position or depth are supplemented by the measurements of well curvature (dogleg) and inclination at each measurement location as the tool string traverses the path of the wellbore. The measurement accuracy in certain such embodiments is enhanced by the use of the independent measurements of well curvature or inclination, obtained in the vicinity of the sensor locations, thereby increasing the accuracy and reliability of the estimation algorithm.

Various embodiments of the present invention have been described above. Although this invention has been described with reference to these specific embodiments, the descriptions are intended to be illustrative of the invention and are not intended to be limiting. Various modifications and applications may occur to those skilled in the art without departing from the true spirit and scope of the invention as defined in the appended claims.

What is claimed is:

1. An apparatus for use in a wellbore, the apparatus comprising:
    a downhole portion movable within the wellbore in a direction generally parallel to the wellbore;
    a first acceleration sensor mounted at a first position within the downhole portion, the first acceleration sensor generating a first signal indicative of a first acceleration in a first direction generally parallel to the wellbore at the first position;
    a second acceleration sensor mounted at a second position within the downhole portion, the second acceleration sensor generating a second signal indicative of a second acceleration in a second direction generally parallel to the wellbore at the second position;
    a bend sensor generating a third signal indicative of an amount of bend of at least a portion of the downhole portion; and
    a controller configurable to calculate a depth along the wellbore, a velocity along the wellbore, or both a depth and a velocity along the wellbore of the downhole portion in response to the first, second, and third signals, and independent of errors from wire-line depth, wire-line velocity, or pipe tally depth measurements.

2. The apparatus of claim 1, wherein the apparatus is a drill string.

3. The apparatus of claim 1, wherein the apparatus is a measurement-while-drilling string.

4. The apparatus of claim 1, wherein the apparatus is a logging string.

5. The apparatus of claim 1, wherein the apparatus is a logging-while-drilling string.

6. The apparatus of claim 1, wherein the bend sensor comprises an optical system comprising a light source and a light detector separated from the light source by a non-zero distance along the wellbore, the light source configured to direct light towards the light detector, the light impinging upon a first portion of the light detector when the downhole portion is in an unbent state and upon a second portion of the light detector when the downhole portion is in a bent state.

7. The apparatus of claim 1, wherein the bend sensor comprises an optical system which uses interferometry to detect the amount of bend.

8. The apparatus of claim 1, wherein the bend sensor detects an amount of deflection of at least one part of the downhole portion relative to another part of the downhole portion.

9. The apparatus of claim 1, wherein the bend sensor detects an amount of mechanical strain in a part of the downhole portion due to the amount of bend.

10. The apparatus of claim 1, wherein the third signal is indicative of an amount of bend in each of two generally orthogonal planes.

11. The apparatus of claim 1, wherein the first direction differs by a non-zero angle relative to the second direction when the downhole portion is in a bent state.

12. The apparatus of claim 1, wherein measurements are taken by the first acceleration sensor, the second acceleration sensor, and the bend sensor simultaneously.

13. The apparatus of claim 1, wherein the first position is separated from the second position by a distance larger than approximately 10 meters.

14. The apparatus of claim 1, wherein the bend sensor is mounted at a third position within the downhole portion, the third position between the first and second positions.

15. The apparatus of claim 14, wherein the third position is located approximately equidistant from the first position and the second position.

16. The system of claim 1, wherein the controller is configurable to calculate the depth along the wellbore, the velocity along the wellbore, or both the depth and the velocity along the wellbore of the downhole portion independent of any surface measurement devices.

17. The system of claim 1, wherein the controller is configurable to calculate the depth along the wellbore, the velocity along the wellbore, or both the depth and the velocity along the wellbore of the downhole portion based entirely on the use of down-hole sensors.

18. A method for generating information indicative of a depth along a wellbore or a velocity along a wellbore, or both a depth and a velocity along a wellbore, of a downhole portion of a tool movable within a wellbore, the method comprising:
 providing a tool comprising:
  a downhole portion movable within the wellbore in a direction generally parallel to the wellbore;
  a first acceleration sensor mounted at a first position within the downhole portion, the first acceleration sensor generating a first signal indicative of a first acceleration in a first direction generally parallel to the wellbore at the first position;
  a second acceleration sensor mounted at a second position within the downhole portion, the second acceleration sensor generating a second signal indicative of a second acceleration in a second direction generally parallel to the wellbore at the second position; and
  a bend sensor generating a third signal indicative of an amount of bend of at least a portion of the downhole portion;
 generating the first signal, the second signal, and the third signal while the downhole portion is at a first location within the wellbore;
 generating the first signal, the second signal, and the third signal while the downhole portion is at a second location within the wellbore; and
 calculating a depth along the wellbore, or a velocity along the wellbore, or both a depth along the wellbore and a velocity along the wellbore, of the downhole portion of the tool in response to the first, second, and third signals generated while the downhole portion is at the first location and the first, second, and third signals generated while the downhole portion is at the second location, and independent of errors from wire-line depth, wire-line velocity, or pipe tally depth measurements.

19. The method of claim 18, wherein calculating a depth along the wellbore, or a velocity along the wellbore, or both a depth along the wellbore and a velocity along the wellbore, of the downhole portion of the survey tool comprises using a recursive algorithm.

20. The method of claim 19, wherein the recursive algorithm employs measurements obtained at multiple locations to update estimates of the depth along the wellbore, the velocity along the wellbore, or both the depth along the wellbore and the velocity along the wellbore of the downhole portion.

21. The method of claim 18, wherein the downhole portion is stationary while at the first location or at the second location.

22. The method of claim 18, wherein the downhole portion is moving while at the first location or at the second location.

23. The method of claim 18, wherein the depth along the wellbore, the velocity along the wellbore, or both the depth and the velocity along the wellbore of the downhole portion are calculated independent of any surface measurement devices.

24. The method of claim 18, wherein the depth along the wellbore, the velocity along the wellbore, or both the depth and the velocity along the wellbore of the downhole portion are calculated based entirely on the use of down-hole sensors.

25. A bendable tool for use in a wellbore, the tool comprising:
 a first acceleration sensor mounted within the tool, the first acceleration sensor configured to generate a first signal indicative of a first acceleration of the first acceleration sensor in a first direction generally parallel to the wellbore;
 a second acceleration sensor mounted within the tool, the second acceleration sensor configured to generate a second signal indicative of a second acceleration of the second acceleration sensor in a second direction generally parallel to the wellbore;
 a bend sensor configured to generate a third signal indicative of an amount of bend of at least a portion of the tool between the first acceleration sensor and the second acceleration sensor; and
 a controller configurable to calculate a depth along the wellbore, a velocity along the wellbore, or both a depth along the wellbore and a velocity along the wellbore of the tool in response to the first, second, and third signals, and independent of errors from wire-line depth, wire-line velocity, or pipe tally depth measurements.

26. The tool of claim 25, wherein at least a portion of the controller is located in a portion of the tool within the wellbore.

27. The tool of claim 25, wherein at least a portion of the controller is located at the surface and is operationally coupled to the portion of the tool within the wellbore.

28. The tool of claim 25, wherein the bend sensor comprises an optical system comprising a light source and a light detector.

29. The tool of claim 25, wherein the bend sensor detects an amount of deflection of at least one part of the tool relative to another part of the tool.

30. The tool of claim 25, wherein the bend sensor detects an amount of mechanical strain in a part of the tool due to the amount of bend.

31. The tool of claim 25, wherein the third signal is indicative of an amount of bend in each of two generally orthogonal planes.

32. The tool of claim 25, wherein the first direction differs by a non-zero angle relative to the second direction when the tool is bent.

33. The tool of claim 25, wherein the bend sensor is mounted between the first and second acceleration sensors.

34. The tool of claim 25, wherein the controller is configurable to calculate the depth along the wellbore, the velocity along the wellbore, or both the depth and the velocity along the wellbore of the downhole portion independent of any surface measurement devices.

35. The tool of claim 25, wherein the controller is configurable to calculate the depth along the wellbore, the velocity along the wellbore, or both the depth and the velocity along the wellbore of the downhole portion based entirely on the use of down-hole sensors.

36. A system for use with an apparatus configured to be inserted into a wellbore, the system comprising:
one or more inputs configured to receive a first signal from a first acceleration sensor of the apparatus, a second signal from a second acceleration sensor of the apparatus, and a third signal from a bend sensor of the apparatus, the first acceleration sensor within a downhole portion of the apparatus, the second acceleration sensor within the downhole portion of the apparatus and spaced from the first acceleration sensor generally along the wellbore, the first signal indicative of a first acceleration of the first acceleration sensor in a first direction generally parallel to the wellbore, the second signal indicative of a second acceleration of the second acceleration sensor in a second direction generally parallel to the wellbore, the third signal indicative of an amount of bend of at least a portion of the apparatus between the first acceleration sensor and the second acceleration sensor; and
a controller configured to calculate a depth along the wellbore, a velocity along the wellbore, or both a depth along the wellbore and a velocity along the wellbore of the downhole portion within the wellbore in response to the first signal, the second signal, and the third signal, and independent of errors from wire-line depth, wire-line velocity, or pipe tally depth measurements.

37. The system of claim 36, wherein at least a portion of the controller is located in a portion of the tool within the wellbore.

38. The system of claim 36, wherein at least a portion of the controller is located at the surface and is operationally coupled to the portion of the apparatus within the wellbore.

39. The system of claim 36, wherein the controller is configurable to calculate the depth along the wellbore, the velocity along the wellbore, or both the depth and the velocity along the wellbore of the downhole portion independent of any surface measurement devices.

40. The system of claim 36, wherein the controller is configurable to calculate the depth along the wellbore, the velocity along the wellbore, or both the depth and the velocity along the wellbore of the downhole portion based entirely on the use of down-hole sensors.

* * * * *